(12) United States Patent
Kikuchi et al.

(10) Patent No.: US 7,833,930 B2
(45) Date of Patent: Nov. 16, 2010

(54) EXHAUST GAS PURIFYING CATALYST AND PRODUCTION METHOD THEREOF

(75) Inventors: Hiroto Kikuchi, Hiratsuka (JP); Masanori Nakamura, Yokosuka (JP); Hironori Wakamatsu, Yokohama (JP); Hideaki Morisaka, Yokohama (JP); Hirofumi Yasuda, Yokosuka (JP); Katsuo Suga, Yokohama (JP); Kazuyuki Shiratori, Yokohama (JP); Kenji Uesugi, Miura (JP); Toshiharu Miyamura, Yokohama (JP)

(73) Assignees: Nissan Motor Co., Ltd., Yokohama-shi (JP); Renault s.a.s., Boulogne-Billancourt (FR)

( * ) Notice: Subject to any disclaimer, the term of this patent is extended or adjusted under 35 U.S.C. 154(b) by 0 days.

(21) Appl. No.: 12/298,461

(22) PCT Filed: Apr. 12, 2007

(86) PCT No.: PCT/JP2007/058076

§ 371 (c)(1), (2), (4) Date: Oct. 24, 2008

(87) PCT Pub. No.: WO2007/125757

PCT Pub. Date: Nov. 8, 2007

(65) Prior Publication Data

US 2009/0088320 A1 Apr. 2, 2009

(30) Foreign Application Priority Data

Apr. 28, 2006 (JP) ............................. 2006-126557
Feb. 13, 2007 (JP) ............................. 2007-032269

(51) Int. Cl.
*B01J 23/10* (2006.01)

(52) U.S. Cl. ....................................... 502/304; 502/308
(58) Field of Classification Search ................. 502/304, 502/308
See application file for complete search history.

(56) References Cited

U.S. PATENT DOCUMENTS

| 4,239,656 | A | 12/1980 | Fujitani et al. | |
|---|---|---|---|---|
| 5,849,659 | A | 12/1998 | Tanaka et al. | |
| 6,852,665 | B2 * | 2/2005 | Imagawa et al. | 502/302 |
| 6,916,450 | B2 * | 7/2005 | Akama et al. | 422/180 |
| 2003/0181316 | A1 * | 9/2003 | Hiramoto et al. | 502/64 |
| 2003/0207759 | A1 * | 11/2003 | Nakamura et al. | 502/304 |
| 2005/0095188 | A1 * | 5/2005 | Matsumoto et al. | 423/213.2 |
| 2006/0189480 | A1 * | 8/2006 | Takeshima | 502/304 |
| 2007/0066479 | A1 | 3/2007 | Takeshima et al. | |
| 2007/0225159 | A1 * | 9/2007 | Ibe et al. | 502/304 |

FOREIGN PATENT DOCUMENTS

| JP | 54-135688 A | 10/1979 |
|---|---|---|
| JP | 8-131830 A | 5/1996 |
| JP | 9-271672 A | 10/1997 |
| JP | 11-319555 A | 11/1999 |
| JP | 2000-042411 A | 2/2000 |
| JP | 2005-125254 A | 5/2005 |

* cited by examiner

*Primary Examiner*—Timothy C Vanoy
*Assistant Examiner*—Michelle Hou
(74) *Attorney, Agent, or Firm*—Foley & Lardner LLP

(57) ABSTRACT

An exhaust gas purifying catalyst including: a plurality of first compounds 5 which have precious metal particles 3 supported thereon and are formed into a particle shape; and second compounds 7 which are arranged among the plurality of first compounds 5 and separate the first compounds 5 from one another, wherein pore volumes of the precious metal particles 3, the first compounds 5 and the second compounds 7 are 0.24 to 0.8 $cm^3/g$.

11 Claims, 6 Drawing Sheets

(a)

(b)

(c)

EXHAUST GAS PURIFYING CATALYST AND PRODUCTION METHOD THEREOF

TECHNICAL FIELD

The present invention relates to an exhaust gas purifying catalyst that purifies exhaust gas discharged from a vehicle such as an automobile, and to a production method of the exhaust gas purifying catalyst.

BACKGROUND ART

In recent years, an emission control for an automobile has been tightened up more and more, and an exhaust gas purifying catalyst has been required to purify harmful components contained in exhaust gas, for example, unburned hydrocarbon (HC) and carbon monoxide with high efficiency. The exhaust gas purifying catalyst is one in which precious metal particles are supported on a surface of a base material such as alumina. The exhaust gas purifying catalyst oxidizes the harmful components contained in the exhaust gas by the precious metal particles, and converts the harmful components into water and gas, which are harmless components. Moreover, in general, purification performance of the catalyst is enhanced as a surface area of the precious metal particles is larger, and accordingly, a particle diameter of the precious metal particles is reduced, whereby the surface area of the precious metal particles is increased, and surface energy thereof is increased.

Here, at an initial stage, the precious metal particles of the exhaust gas purifying catalyst are in a state of ultrafine particles with a diameter of several nanometers or less. However, there is a problem that, as the exhaust gas purifying catalyst is being exposed to a high-temperature oxidizing atmosphere, the surface of the precious metal particles is oxidized, the precious metal particles located in mutual vicinities are coagulated with each other and are coarsened to several ten nanometers, and the surface area of the precious metal particles is decreased, resulting in a decrease of a purification rate for such harmful substances. In order to prevent the decrease of the surface area owing to the coarsening of the precious metal particles, development regarding a production method of precious metal particles with a large surface area, such as a reversed micelle method, has been advanced.

In this reversed micelle method, first, an aqueous solution containing a surfactant and a catalyst active component (for example, a precious metal element) is mixed into an organic solvent. Thereafter, an emulsion solution, in which reversed micelles containing the aqueous solution containing the precious metal are formed, is prepared in the organic solvent, and the precious metal is deposited therein. Thereafter, the precious metal is reduced or insolubilized, and the precious metal atomized in the reversed micelle is precipitated. The reversed micelle method is a method as described above. Moreover, in Japanese Patent Laid-Open Publication No. 2000-42411, a method is disclosed, which is for producing a catalyst in such a manner that an element having an oxygen occlusion function is contained in the reversed micelles in an emulsion solution preparation step. In this reversed micelle method, the catalyst active component is supported on the base material in the reversed micelles contained in the emulsion solution, and thereafter, the reversed micelles are collapsed, and an obtained deposit is subjected to the respective steps of filtration, drying, milling and calcining, whereby the catalyst is produced. The catalyst produced by using this production method not only can support the element having the oxygen occlusion function on the base material but also supports the catalyst active component also on an outermost surface of the base material and pore surfaces formed in the base material, and accordingly, can enhance activity thereof.

However, in the above-described reversed micelle method, there has been a problem that, since the catalyst is produced by spraying and calcining the emulsion solution in which the reversed micelles are formed, a production process of the catalyst becomes complicated, leading to an increase of production cost thereof.

In this connection, it is an object of the present invention to provide an exhaust gas purifying catalyst in which a production process is simple and a high purification rate can be maintained for a long term, and to provide a production method of the exhaust gas purifying catalyst.

Patent Document 1: Japanese Patent Laid-Open Publication No.

DISCLOSURE OF THE INVENTION

An exhaust gas purifying catalyst according to the present invention includes: precious metal particles which contact exhaust gas and purify harmful components; a plurality of first compounds on which the precious metal particles are supported; and second compounds which are arranged among these first compounds and separate the first compounds from one another, wherein pore volumes of these precious metal particles, first compounds and second compounds are within a range of 0.24 to 0.8 $cm^3/g$. Moreover, a production method of an exhaust gas purifying catalyst according to the present invention includes: a supporting step of supporting precious metal particles on first compounds; a slurrying step of slurrying second compounds or a precursor of the second compounds by performing water dispersion therefor; a dispersion step of dispersing the first compounds having the precious metal particles supported thereon into the slurry of the second compounds; and a drying/calcining step of drying the slurry of the second compounds, into which the first compounds are dispersed, followed by calcining, wherein, in the dispersion step, treatment is performed under a condition where aggregates of the first compounds having the precious metal particles supported thereon are decomposed.

In accordance with the exhaust gas purifying catalyst according to the present invention and with the production method thereof, the second compounds are arranged among the plurality of first compounds having the precious metal particles supported thereon, whereby the first compounds are separated from one another by interposing the second compounds thereamong. Accordingly, even after the catalyst is used for a long term, the precious metal particles are not coagulated with each other, or the first compounds are not coagulated with each other. In such a way, a catalyst that maintains a large surface area can be obtained.

BRIEF DESCRIPTION OF THE DRAWINGS

FIG. 3A shows a precious metal particle; FIG. 3B shows a state where the precious metal particle is supported on a first compound; and FIG. 3C shows a state where the first compounds having the precious metal particles supported thereon are covered with second compounds.

BEST MODE FOR CARRYING OUT THE INVENTION

A description will be made below of an embodiment of the present invention based on the drawings.

[Catalyst]

Figure 1:
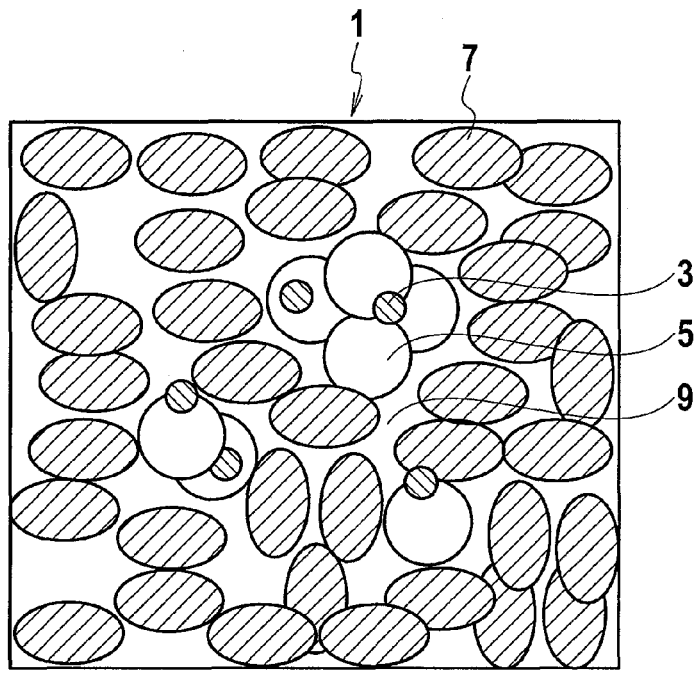
FIG. 1 is a schematic view enlargedly showing an exhaust gas purifying catalyst according to an embodiment of the present invention.

FIG. 1 is a schematic view enlargedly showing a state of a cross section of an exhaust gas purifying catalyst according to the present invention.

As shown in FIG. 1, the exhaust gas purifying catalyst 1 according to the present invention includes: precious metal particles 3 as active metal that contacts exhaust gas and purifies harmful components; a plurality of first compounds 5 on which the precious metal particles 3 are supported; and second compounds 7 which are arranged among the plurality of first compounds 5 and separate the first compounds 5 from one another, wherein pore volumes of these precious metal particles 3, first compounds 5 and second compounds 7 are set within a range of 0.24 to 0.8 cm³/g. In such a way, movement and coagulation of the precious metal particles 3 can be suppressed, and in addition, mutual coagulation of the first compounds 5 can also be suppressed. Hence, a surface area of a precious metal layer composed of groups of the precious metal particles 3 can be suitably suppressed from being decreased after the catalyst 1 is exposed to the exhaust gas.

In the case of suppressing the movement of the precious metal particles 3, there is considered: (1) a chemical restraint method (anchoring method) of suppressing the movement of the precious metal particles 3 by chemically boding to the precious metal particles 3; or (2) a physical restraint method (inclusion method) of suppressing the movement of the precious metal particles 3 by covering the precious metal particles 3 with compounds. In addition to these (1) and (2), and in addition to suppression of the first compounds 5 themselves supported on the precious metal particles 3, the present invention further suppresses sintering of the precious metal particles 3.

In the case of covering the first compounds 5 having the precious metal particles 3 supported thereon with the second compounds 7, it is necessary that the exhaust gas be diffused and reach surfaces of the precious metal particles 3. For this purpose, gaps with a size of a predetermined range are required for the first compounds 5 and the second compounds 7, and these gaps just need to be formed so that the pore volumes of the precious metal particles 3, the first compounds 5 and the second compounds 7 can be set within the predetermined range. It is sufficient if an initial pore volume of the catalyst, that is, a pore volume of the catalyst before the catalyst is exposed to the exhaust gas is within a range of 0.3 to 0.8 cm³/g, and if a pore volume of the catalyst after the catalyst is exposed to the exhaust gas is within a range of 0.24 to 0.45 cm³/g. Hence, a condition to be defined is to set the pore volumes of the precious metal particles 3, the first compounds 5 and the second compounds 7 within a range of 0.24 to 0.8 cm³/g.

[Precious Metal Particle]

It is preferable that the precious metal particles 3 be composed of at least any selected from platinum (Pt), palladium (Pd) and rhodium (Rh). It is preferable that a particle diameter of the precious metal particles 3 be 1 nm to 5 nm.

[First Compound]

It is preferable that the first compounds 5 on which the precious metal particles 3 are supported be formed into a particle shape. Moreover, it is preferable that the first compounds 5 be an oxide containing Ce. Specifically, a compound containing $CeO_2$ and a composite oxide of Ce and Zr can be used. In the case where the first compounds 5 are the oxide containing Ce, the following combinations are preferable for the precious metal particles 3, the first compounds 5 and the second compounds 7.

(a-1) Preferable is a combination of Pt particles as the precious metal particles 3, $CeO_2$ particles as the first compounds 5, and $Al_2O_3$ particles as the second compounds 7, that is, a combination in which the $Al_2O_3$ particles are arranged among the $CeO_2$ particles on which the Pt particles are supported.

(a-2) Preferable is a combination of the Pt particles as the precious metal particles 3, $CeZrO_x$ particles as the first compounds 5, and $Al_2O_3$ particles as the second compounds 7. Specifically, it is preferable to arrange the $Al_2O_3$ particles among the $CeZrO_x$ particles on which the Pt particles are supported.

(a-3) Preferable is a combination of the Pt particles as the precious metal particles 3, the $CeO_2$ particles as the first compounds 5, and $ZrO_2$ particles as the second compounds 7. Specifically, it is preferable to arrange the $ZrO_2$ particles among the $CeO_2$ particles on which the Pt particles are supported.

(a-4) Preferable is a combination of the Pt particles as the precious metal particles 3, the $CeO_2$ particles as the first compounds 5, and a composite oxide of $Al_2O_3$ and $ZrO_2$ as the second compounds 7. Specifically, it is preferable to arrange the composite oxide of $Al_2O_3$ and $ZrO_2$ among the $CeO_2$ particles on which the Pt particles are supported.

(a-5) Preferable is a combination of the Pt particles as the precious metal particles 3, the $CeZrO_x$ particles as the first compounds 5, and the composite oxide of $Al_2O_3$ and $ZrO_2$ as the second compounds 7. Specifically, it is preferable to arrange the composite oxide of $Al_2O_3$ and $ZrO_2$ among the $CeZrO_x$ particles on which the Pt particles are supported.

In the case where the first compounds 5 are the oxide containing $CeO_2$, the following combinations are preferable for the precious metal particles 3, the first compounds 5 and the second compounds 7.

(b-1) Preferable is a combination of the Pt particles as the precious metal particles 3, the $CeO_2$ particles as the first compounds 5, and the $Al_2O_3$ particles as the second compounds 7, that is, a combination in which the $Al_2O_3$ particles are arranged among the $CeO_2$ particles on which the Pt particles are supported.

(b-2) Preferable is a combination of the Pt particles as the precious metal particles 3, the $CeO_2$ particles as the first compounds 5, and the $ZrO_2$ particles as the second compounds 7. Specifically, it is preferable to arrange the $ZrO_2$ particles among the $CeO_2$ particles on which the Pt particles are supported.

(b-3) Preferable is a combination of the Pt particles as the precious metal particles 3, the $CeO_2$ particles as the first compounds 5, and the composite oxide of $Al_2O_3$ and $ZrO_2$ as the second compounds 7. Specifically, it is preferable to arrange the composite oxide of $Al_2O_3$ and $ZrO_2$ among the $CeO_2$ particles on which the Pt particles are supported.

In the case where the first compounds 5 are a composite oxide containing Ce and Zr, the following combinations are preferable for the precious metal particles 3, the first compounds 5 and the second compounds 7.

(c-1) Preferable is a combination of the Pt particles as the precious metal particles 3, the $CeZrO_x$ particles as the first compounds 5, and the $Al_2O_3$ particles as the second compounds 7. Specifically, it is preferable to arrange the $Al_2O_3$ particles among the $CeZrO_x$ particles on which the Pt particles are supported.

(c-2) Preferable is a combination of the Pt particles as the precious metal particles 3, the $CeZrO_x$ particles as the first compounds 5, and the composite oxide of $Al_2O_3$ and $ZrO_2$ as the second compounds 7. Specifically, it is preferable to arrange the composite oxide of $Al_2O_3$ and $ZrO_2$ among the $CeZrO_x$ particles on which the Pt particles are supported.

In the case where the first compounds 5 are a composite oxide of Mn and Al, the following combinations are preferable for the precious metal particles 3, the first compounds 5 and the second compounds 7.

(c-1) Preferable is a combination of the Pt particles as the precious metal particles 3, $MnAl_2O_4$ particles as the first compounds 5, and the $Al_2O_3$ particles as the second compounds 7. Specifically, it is preferable to arrange the $Al_2O_3$ particles among the $MnAl_2O_4$ particles on which the Pt particles are supported.

[Second Compound]

It is preferable that the above-described second compounds 7 be an oxide containing at least any of Al and Zr. In a combination in the present invention, the best combination is a combination in which Pt—$CeO_2$ is covered with $Al_2O_3$, or in which Pt—$CeZrO_2$ is covered with $Al_2O_3$. Moreover, a combination in which Pt—$CeO_2$ is covered with $ZrO_2$ is also good. Furthermore, a combination in which Pt—$CeO_2$ or Pt—$CeZrO_x$ is covered with the composite oxide of $Al_2O_3$ and $ZrO_2$ is also good. Moreover, it is preferable that the above-described second compounds 7 be formed into a particle shape, and that an average particle diameter of the above-described second compounds 7 be 10 to 100 nm.

Figure 2:
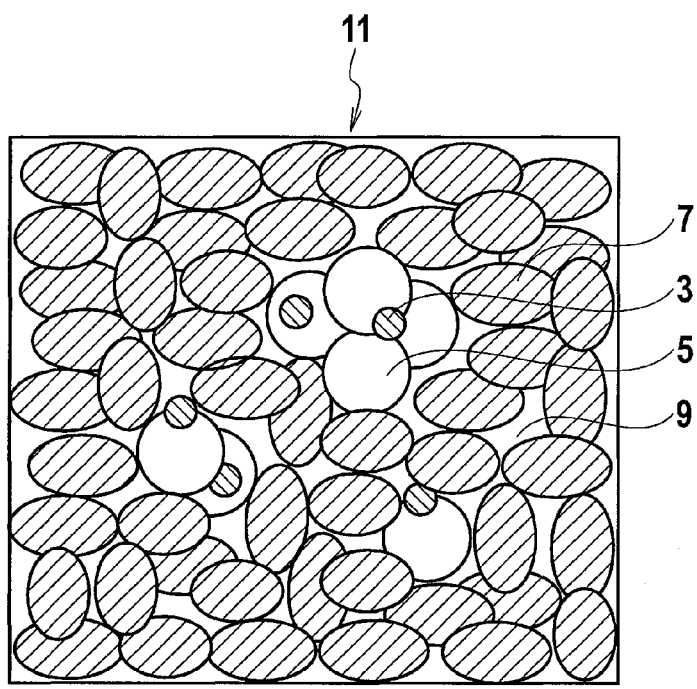
FIG. 2 is a schematic view enlargedly showing an exhaust gas purifying catalyst according to a comparative example.

In the catalyst 1 according to the embodiment of the present invention, as shown in FIG. 1, pores 7 are formed by gaps among the particles of the second compounds 7, and by gaps among the particles of the first compounds 5 and the second compounds 7. Here, in the case where the particle diameter of the particles of the second compounds 7 is smaller than 10 nm, then, like a catalyst 11 shown in FIG. 2, the pores 9 formed of the particles of the second compounds 7 become small, and the pore volume becomes small. Therefore, the exhaust gas becomes less likely to be diffused through the pores 9, and catalyst activity of the catalyst 11 is decreased. Meanwhile, in the case where the particle diameter of the particles of the second compounds 7 becomes larger than 100 nm, then the pores formed thereof become large, and the particles of the first compounds 5 on which the precious metal particles are supported come off from the gaps among the particles of the second compounds 7, causing such an influence that the particles of the first compounds 5 are coagulated with one another.

[Production Method of Catalyst]

A production method of the catalyst according to this embodiment includes: a supporting step of supporting the precious metal particles 3 on the first compounds 5; a slurrying step of slurrying the second compounds 7 or a precursor of the second compounds 7 by performing water dispersion therefor; a dispersion step of dispersing the first compounds 5 having the precious metal particles 3 supported thereon into the slurry of the second compounds 7; and a drying/calcining step of drying the slurry of the second compounds, into which the first compounds are dispersed, followed by calcining, wherein, in the dispersion step, treatment is performed under a condition where aggregates of the first compounds 5 having the precious metal particles 3 supported thereon are decomposed.

Figure 3:
FIGS. 3A to 3C are schematic views showing a production process of the exhaust gas purifying catalyst according to the embodiment of the present invention.
Figure 3:
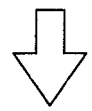
Figure 3:
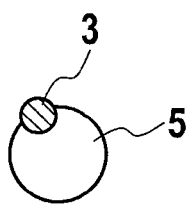
Figure 3:
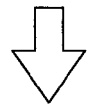
Figure 3:
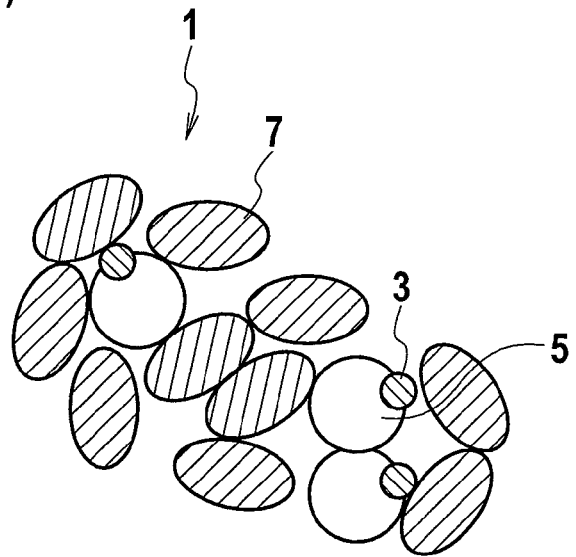

FIGS. 3A to 3C are schematic views showing a production process of the catalyst 1 according to the embodiment of the present invention: FIG. 3A shows the precious metal particle 3; FIG. 3B shows a state where the precious metal particle 3 is supported on the first compound 5; and FIG. 3C shows the catalyst 1 in which the first compounds 5 having the precious metal particles 3 supported thereon are covered with the second compounds 7. For such treatment of decomposing the aggregates of the first compounds 5 on which the precious metal particles 3 are supported and dispersing the first compounds 5 into the second compounds 7, a method using a dispersant such as polyvinylpyrrolidone, a physical method using shear force brought by high-speed stirring, and the like can be used.

EXAMPLES

Subsequently, a description will be specifically made of the present invention through examples.

Example 1

$CeO_2$ particles with an average particle diameter of 30 nm were used as the first compounds 5. Dinitrodiamine Pt was impregnated into the $CeO_2$ particles, whereby $CeO_2$ particles having Pt supported thereon by 0.85 wt % (these are referred to as "ceria particles A") were formed. 118.42 g of needle-like boehmite (ø10 nm×100 nm) in which moisture was contained by 24 wt % was put into a beaker, dispersed into water, and deflocculated by acid. To a resultant thus obtained, 90 g of the ceria particles A prepared in advance was added, and was dispersed thereinto by high-speed stirring. Thereafter, slurry thus obtained was dried and calcined, whereby powder a-1 in which the ceria particles A were coated with alumina was prepared. 173.4 g of this powder a-1 and 1.6 g of boehmite alumina were added to a ball mill. Thereafter, 307.5 g of water and 17.5 g of a 10 wt % nitric acid solution were added to the ball mill, and the powder a-1 was milled, whereby slurry with an average-particle diameter of 3 μm (this is referred to as "slurry a-1") was formed.

Next, rhodium nitrate was impregnated into a zirconium-cerium composite oxide with an average particle diameter of 20 nm, whereby particles B of the second compounds 7, which had rhodium supported thereon by 0.814%, were prepared. 118.42 g of needle-like boehmite in which moisture was contained by 24 wt % was put into a beaker, dispersed into water, and deflocculated by acid. To a resultant thus obtained, 90 g of the particles B prepared in advance was added, and was dispersed thereinto by the high-speed stirring. Thereafter, slurry thus obtained was dried and calcined, whereby powder b-1 in which the particles B were coated with alumina was prepared. 172 g of this powder b-1 and 3 g of boehmite alumina were added to a ball mill. Thereafter, 307.5 g of water and 17.5 g of a 10 wt % nitric acid solution were further added to the ball mill, and the powder b-1 was milled, whereby slurry with an average particle diameter of 3 μm (this is referred to as "slurry b-1") was formed. The slurry a-1 was coated by 141 g/L on a honeycomb carrier (capacity: 0.04 L) having a diameter of ø36 mm and 400 cells with a wall thickness of 6 mils, followed by drying, and thereafter, the slurry b-1 was coated by 59 g/L thereon, followed by drying. Thereafter, a resultant was calcined at 400° C., whereby a sample of Example 1 was obtained. The obtained sample of Example 1 is a catalyst that individually carries thereon Pt by 0.593 g/L and Rh by 0.236 g/L.

Example 2

$CeO_2$ particles with an average particle diameter of 30 nm were used as the first compounds 5. Dinitrodiamine Pt was impregnated into the $CeO_2$ particles, whereby $CeO_2$ particles having Pt supported thereon by 0.85 wt % (these are referred to as "ceria particles A") were formed. 113.92 g of plate-like boehmite (20×20×10 nm) in which moisture was contained by 21 wt % was put into a beaker, dispersed into water, and deflocculated by acid. To a resultant thus obtained, 90 g of the ceria particles A prepared in advance was added, and was dispersed thereinto by high-speed stirring. Thereafter, slurry thus obtained was dried and calcined, whereby powder a-2 in which the ceria particles A were coated with alumina was prepared. 173.4 g of this powder a-2 and 1.6 g of boehmite alumina were added to a ball mill. Thereafter, 307.5 g of water and 17.5 g of a 10 wt % nitric acid solution were added to the ball mill, and the powder a-2 was milled, whereby slurry with an average particle diameter of 3 μm (this is referred to as "slurry a-2") was formed.

Next, rhodium nitrate was impregnated into a zirconium-cerium composite oxide with an average particle diameter of 20 nm, whereby particles B having rhodium supported thereon by 0.814% were prepared. 113.92 g of needle-like boehmite (in which moisture was contained by 21 wt %) was put into a beaker, dispersed into water, and deflocculated by acid. To a resultant thus obtained, 90 g of the particles B prepared in advance was added, and was dispersed thereinto by the high-speed stirring. Thereafter, slurry thus obtained was dried and calcined, whereby powder b-2 in which the particles B were coated with alumina was prepared. 172 g of this powder b-2 and 3 g of boehmite alumina were added to a ball mill. Thereafter, 307.5 g of water and 17.5 g of a 10 wt % nitric acid solution were further added to the ball mill, and the powder b-2 was milled, whereby slurry with an average particle diameter of 3 μm (this is referred to as "slurry b-2") was formed. The slurry a-2 was coated by 141 g/L on a honeycomb carrier (capacity: 0.04 L) having a diameter of ø36 mm and 400 cells with a wall thickness of 6 mils, followed by drying, and thereafter, the slurry b-2 was coated by 59 g/L thereon, followed by drying. Thereafter, a resultant was calcined at 400° C., whereby a sample of Example 2 was obtained. The obtained sample of Example 2 is a catalyst that individually carries thereon Pt by 0.593 g/L and Rh by 0.236 g/L.

Example 3

$CeO_2$ particles with an average particle diameter of 30 nm were used as the first compounds 5. Dinitrodiamine Pt was impregnated into the $CeO_2$ particles, whereby $CeO_2$ particles having Pt supported thereon by 0.85 wt % (these are referred to as "ceria particles A") were formed. 105.88 g of cube-like boehmite with a dimension of 20×20×20 nm (in which moisture was contained by 15 wt %) was put into a beaker, dispersed into water, and deflocculated by acid. To a resultant thus obtained, 90 g of the ceria particles A prepared in advance was added, and was dispersed thereinto by high-speed stirring. Thereafter, slurry thus obtained was dried and calcined, whereby powder a-3 in which the ceria particles A were coated with alumina was prepared. 173.4 g of this powder a-3 and 1.6 g of boehmite alumina were added to a ball mill. Thereafter, 307.5 g of water and 17.5 g of a 10 wt % nitric acid solution were added to the ball mill, and the powder a-3 was milled, whereby slurry with an average particle diameter of 3 μm (this is referred to as "slurry a-3") was formed.

Next, rhodium nitrate was impregnated into a zirconium-cerium composite oxide with an average particle diameter of 20 nm, whereby particles B having rhodium supported thereon by 0.814% were prepared. 105.88 g of cube-like boehmite in which moisture was contained by 15 wt % was put into a beaker, dispersed into water, and deflocculated by acid. To a resultant thus obtained, 90 g of the particles B prepared in advance was added, and was dispersed thereinto by the high-speed stirring. Thereafter, slurry thus obtained was dried and calcined, whereby powder b-3 in which the particles B were coated with alumina was prepared. 172 g of this powder b-3 and 3 g of boehmite alumina were added to a ball mill. Thereafter, 307.5 g of water and 17.5 g of a 10 wt % nitric acid solution were further added to the ball mill, and the powder b-3 was milled, whereby slurry with an average particle diameter of 3 μm (this is referred to as "slurry b-3") was formed. The slurry a-3 was coated by 141 g/L on a honeycomb carrier (capacity: 0.04 L) having a diameter of ø36 mm and 400 cells with a wall thickness of 6 mils, followed by drying, and thereafter, the slurry b-3 was coated by 59 g/L thereon, followed by drying. Thereafter, a resultant was calcined at 400° C., whereby a sample of Example 3 was obtained. The obtained sample of Example 3 is a catalyst that individually carries thereon Pt by 0.593 g/L and Rh by 0.236 g/L.

Example 4

$CeO_2$ particles with an average particle diameter of 30 nm were used as the first compounds 5. Dinitrodiamine Pt was impregnated into the $CeO_2$ particles, whereby $CeO_2$ particles having Pt supported thereon by 0.85 wt % (these are referred to as "ceria particles A") were formed. 102.27 g of prism-like boehmite (20×20×60 nm) in which moisture was contained by 12 wt % was put into a beaker, dispersed into water, and deflocculated by acid. To a resultant thus obtained, 90 g of the ceria particles A prepared in advance was added, and was dispersed thereinto by high-speed stirring. Thereafter, slurry thus obtained was dried and calcined, whereby powder a-4 in which the ceria particles A were coated with alumina was prepared. 173.4 g of this powder a-4 and 1.6 g of boehmite alumina were added to a ball mill. Thereafter, 307.5 g of water and 17.5 g of a 10 wt % nitric acid solution were added to the ball mill, and the powder a-4 was milled, whereby slurry with an average particle diameter of 3 μm (this is referred to as "slurry a-4") was formed.

Next, rhodium nitrate was impregnated into a zirconium-cerium composite oxide with an average particle diameter of 20 nm, whereby particles B having rhodium supported thereon by 0.814% were prepared. 102.27 g of prism-like boehmite (in which moisture was contained by 12 wt %) was put into a beaker, dispersed into water, and deflocculated by acid. To a resultant thus obtained, 90 g of the particles B prepared in advance was added, and was dispersed thereinto by the high-speed stirring. Thereafter, slurry thus obtained was dried and calcined, whereby powder b-4 in which the particles B were coated with alumina was prepared. 172 g of this powder b-4 and 3 g of boehmite alumina were added to a ball mill. Thereafter, 307.5 g of water and 17.5 g of a 10 wt % nitric acid solution were further added to the ball mill, and the powder b-4 was milled, whereby slurry with an average particle diameter of 3 μm (this is referred to as "slurry b-4") was formed. The slurry a-4 was coated by 141 g/L on a honeycomb carrier (capacity: 0.04 L) having a diameter of ø36 mm and 400 cells with a wall thickness of 6 mils, followed by drying, and thereafter, the slurry b-4 was coated by 59 g/L thereon, followed by drying. Thereafter, a resultant was calcined at 400° C., whereby a sample of Example 4 was obtained. The obtained sample of Example 4 is a catalyst that individually carries thereon Pt by 0.593 g/L and Rh by 0.236 g/L.

Example 5

CeO₂ particles with an average particle diameter of 30 nm were used as the first compounds 5. Dinitrodiamine Pt was impregnated into the CeO₂ particles, whereby CeO₂ particles having Pt supported thereon by 0.85 wt % (these are referred to as "ceria particles A") were formed. 90.9 g of alumina nanoparticles with an average particle diameter of 40 nm (in which moisture was contained by 1 wt %) was put into a beaker, dispersed into water, and deflocculated by acid. To a resultant thus obtained, 90 g of the ceria particles A prepared in advance was added, and was dispersed thereinto by high-speed stirring. Thereafter, slurry thus obtained was dried and calcined, whereby powder a-5 in which the ceria particles A were coated with alumina was prepared. 173.4 g of this powder a-5 and 1.6 g of boehmite alumina were added to a ball mill. Thereafter, 307.5 g of water and 17.5 g of a 10 wt % nitric acid solution were added to the ball mill, and the powder a-5 was milled, whereby slurry with an average particle diameter of 3 μm (this is referred to as "slurry a-5") was formed.

Next, rhodium nitrate was impregnated into a zirconium-cerium composite oxide with an average particle diameter of 20 nm, whereby particles B having rhodium supported thereon by 0.814% were prepared. 90.9 g of alumina nanoparticles with an average particle diameter of 40 nm (in which moisture was contained by 1 wt %) was put into a beaker, dispersed into water, and deflocculated by acid. To a resultant thus obtained, 90 g of the particles B prepared in advance was added, and was dispersed thereinto by the high-speed stirring. Thereafter, slurry thus obtained was dried and calcined, whereby powder b-5 in which the particles B were coated with alumina was prepared. 172 g of this powder b-5 and 3 g of boehmite alumina were added to a ball mill. Thereafter, 307.5 g of water and 17.5 g of a 10 wt % nitric acid solution were further added to the ball mill, and the powder b-5 was milled, whereby slurry with an average particle diameter of 3 μm (this is referred to as "slurry b-5") was formed. The slurry a-5 was coated by 141 g/L on a honeycomb carrier (capacity: 0.04 L) having a diameter of ø36 mm and 400 cells with a wall thickness of 6 mils, followed by drying, and thereafter, the slurry b-5 was coated by 59 g/L thereon, followed by drying. Thereafter, a resultant was calcined at 400° C., whereby a sample of Example 5 was obtained. The obtained sample of Example 5 is a catalyst that individually carries thereon Pt by 0.593 g/L and Rh by 0.236 g/L.

Example 6

Cerium-zirconium composite oxide particles with an average particle diameter of 20 nm were used as the first compounds 5. Dinitrodiamine Pt was impregnated into the particles, whereby cerium-zirconium composite oxide particles having Pt supported thereon by 0.85 wt % (these are referred to as "particles C") were formed. 118.42 g of needle-like boehmite (in which moisture was contained by 24 wt %) was put into a beaker, dispersed into water, and deflocculated by acid. To a resultant thus obtained, 90 g of the particles C prepared in advance was added, and was dispersed thereinto by high-speed stirring. Thereafter, slurry thus obtained was dried and calcined, whereby powder ac-6 in which the particles C were coated with alumina was prepared. 173.4 g of this powder ac-6 and 1.6 g of boehmite alumina were added to a ball mill. Thereafter, 307.5 g of water and 17.5 g of a 10 wt % nitric acid solution were added to the ball mill, and the powder ac-6 was milled, whereby slurry with an average particle diameter of 3 μm (this is referred to as "slurry ac-6") was formed.

Next, rhodium nitrate was impregnated into a zirconium-cerium composite oxide with an average particle diameter of 20 nm, whereby particles B having rhodium supported thereon by 0.814% were prepared. 118.42 g of needle-like boehmite (in which moisture was contained by 24 wt %) was put into a beaker, dispersed into water, and deflocculated by acid. To a resultant thus obtained, 90 g of the particles B prepared in advance was added, and was dispersed thereinto by the high-speed stirring. Thereafter, slurry thus obtained was dried and calcined, whereby powder b-1 in which the particles B were coated with alumina was prepared. 172 g of this powder b-1 and 3 g of boehmite alumina were added to a ball mill. Thereafter, 307.5 g of water and 17.5 g of a 10 wt % nitric acid solution were further added to the ball mill, and the powder b-1 was milled, whereby slurry with an average particle diameter of 3 μm (this is referred to as "slurry b-1") was formed. The slurry ac-6 was coated by 141 g/L on a honeycomb carrier (capacity: 0.04 L) having a diameter of ø36 mm and 400 cells with a wall thickness of 6 mils, followed by drying, and thereafter, the slurry b-1 was coated by 59 g/L thereon, followed by drying. Thereafter, a resultant was calcined at 400° C., whereby a sample of Example 6 was obtained. The obtained sample of Example 6 is a catalyst that individually carries thereon Pt by 0.593 g/L and Rh by 0.236 g/L.

Example 7

Cerium-zirconium composite oxide particles with an average particle diameter of 20 nm were used as the first compounds 5. Dinitrodiamine Pt was impregnated into the particles, whereby cerium-zirconium composite oxide particles having Pt supported thereon by 0.85 wt % (these are referred to as "particles C") were formed. 113.92 g of plate-like boehmite (in which moisture was contained by 21 wt %) was put into a beaker, dispersed into water, and deflocculated by acid. To a resultant thus obtained, 90 g of the particles C prepared in advance was added, and was dispersed thereinto by high-speed stirring. Thereafter, slurry thus obtained was dried and calcined, whereby powder ac-7 in which the particles C were coated with alumina was prepared. 173.4 g of this powder ac-7 and 1.6 g of boehmite alumina were added to a ball mill. Thereafter, 307.5 g of water and 17.5 g of a 10 wt % nitric acid solution were added to the ball mill, and the powder ac-7 was milled, whereby slurry with an average particle diameter of 3 µm (this is referred to as "slurry ac-7") was formed.

Next, rhodium nitrate was impregnated into a zirconium-cerium composite oxide with an average particle diameter of 20 nm, whereby particles B having rhodium supported thereon by 0.814% were prepared. 113.92 g of plate-like boehmite (in which moisture was contained by 21 wt %) was put into a beaker, dispersed into water, and deflocculated by acid. To a resultant thus obtained, 90 g of the particles B prepared in advance was added, and was dispersed thereinto by the high-speed stirring. Thereafter, slurry thus obtained was dried and calcined, whereby powder b-2 in which the particles B were coated with alumina was prepared. 172 g of this powder b-2 and 3 g of boehmite alumina were added to a ball mill. Thereafter, 307.5 g of water and 17.5 g of a 10 wt % nitric acid solution were further added to the ball mill, and the powder b-2 was milled, whereby slurry with an average particle diameter of 3 µm (this is referred to as "slurry b-2") was formed. The slurry ac-7 was coated by 141 g/L on a honeycomb carrier (capacity: 0.04 L) having a diameter of ø36 mm and 400 cells with a wall thickness of 6 mils, followed by drying, and thereafter, the slurry b-2 was coated by 59 g/L thereon, followed by drying. Thereafter, a resultant was calcined at 400° C., whereby a sample of Example 7 was obtained. The obtained sample of Example 7 is a catalyst that individually carries thereon Pt by 0.593 g/L and Rh by 0.236 g/L.

Example 7

Cerium-zirconium composite oxide particles with an average particle diameter of 20 nm were used as the first compounds 5. Dinitrodiamine Pt was impregnated into the particles, whereby cerium-zirconium composite oxide particles having Pt supported thereon by 0.85 wt % (these are referred to as "particles C") were formed. 105.88 g of cube-like boehmite (in which moisture was contained by 15 wt %) was put into a beaker, dispersed into water, and deflocculated by acid. To a resultant thus obtained, 90 g of the particles C prepared in advance was added, and was dispersed thereinto by high-speed stirring. Thereafter, slurry thus obtained was dried and calcined, whereby powder ac-8 in which the particles C were coated with alumina was prepared. 173.4 g of this powder ac-8 and 1.6 g of boehmite alumina were added to a ball mill. Thereafter, 307.5 g of water and 17.5 g of a 10 wt % nitric acid solution were added to the ball mill, and the powder ac-8 was milled, whereby slurry with an average particle diameter of 3 µm (this is referred to as "slurry ac-8") was formed.

Next, rhodium nitrate was impregnated into a zirconium-cerium composite oxide with an average particle diameter of 20 nm, whereby particles B having rhodium supported thereon by 0.814% were prepared. 105.88 g of cube-like boehmite (in which moisture was contained by 15 wt %) was put into a beaker, dispersed into water, and deflocculated by acid. To a resultant thus obtained, 90 g of the particles B prepared in advance was added, and was dispersed thereinto by the high-speed stirring. Thereafter, slurry thus obtained was dried and calcined, whereby powder b-3 in which the particles B were coated with alumina was prepared. 172 g of this powder b-3 and 3 g of boehmite alumina were added to a ball mill. Thereafter, 307.5 g of water and 17.5 g of a 10 wt % nitric acid solution were further added to the ball mill, and the powder b-3 was milled, whereby slurry with an average particle diameter of 3 µm (this is referred to as "slurry b-3") was formed. The slurry ac-8 was coated by 141 g/L on a honeycomb carrier (capacity: 0.04 L) having a diameter of ø36 mm and 400 cells with a wall thickness of 6 mils, followed by drying, and thereafter, the slurry b-3 was coated by 59 g/L thereon, followed by drying. Thereafter, a resultant was calcined at 400° C., whereby a sample of Example 8 was obtained. The obtained sample of Example 8 is a catalyst that individually carries thereon Pt by 0.593 g/L and Rh by 0.236 g/L.

Example 9

Manganese aluminate particles with an average particle diameter of 40 nm were used as the first compounds 5. Dinitrodiamine Pd was impregnated into the particles, whereby manganese aluminate particles having Pd supported thereon by 0.85 wt % (these are referred to as "particles D") were formed. 113.92 g of plate-like boehmite (in which moisture was contained by 21 wt %) was put into a beaker, dispersed into water, and deflocculated by acid. To a resultant thus obtained, 90 g of the particles D prepared in advance was added, and was dispersed thereinto by high-speed stirring. Thereafter, slurry thus obtained was dried and calcined, whereby powder ad-9 in which the particles D were coated with alumina was prepared. 173.4 g of this powder ad-9 and 1.6 g of boehmite alumina were added to a ball mill. Thereafter, 307.5 g of water and 17.5 g of a 10 wt % nitric acid solution were added to the ball mill, and the powder ad-9 was milled, whereby slurry with an average particle diameter of 3 µm (this is referred to as "slurry ad-9") was formed.

Next, rhodium nitrate was impregnated into a zirconium-cerium composite oxide with an average particle diameter of 20 nm, whereby particles B having rhodium supported thereon by 0.814% were prepared. 113.92 g of plate-like boehmite (in which moisture was contained by 21 wt %) was put into a beaker, dispersed into water, and deflocculated by acid. To a resultant thus obtained, 90 g of the particles B prepared in advance was added, and was dispersed thereinto by the high-speed stirring. Thereafter, slurry thus obtained was dried and calcined, whereby powder b-2 in which the particles B were coated with alumina was prepared. 172 g of this powder b-2 and 3 g of boehmite alumina were added to a ball mill. Thereafter, 307.5 g of water and 17.5 g of a 10 wt % nitric acid solution were further added to the ball mill, and the powder b-2 was milled, whereby slurry with an average particle diameter of 3 µm (this is referred to as "slurry b-2") was formed. The slurry ad-9 was coated by 141 g/L on a honeycomb carrier (capacity: 0.04 L) having a diameter of ø36 mm and 400 cells with a wall thickness of 6 mils, followed by drying, and thereafter, the slurry b-2 was coated by 59 g/L thereon, followed by drying. Thereafter, a resultant was calcined at 400° C., whereby a sample of Example 9 was obtained. The obtained sample of Example 9 is a catalyst that individually carries thereon Pd by 0.593 g/L and Rh by 0.236 g/L.

Example 10

Manganese aluminate particles with an average particle diameter of 40 nm were used as the first compounds 5. Dinitrodiamine Pd was impregnated into the particles, whereby manganese aluminate particles having Pd supported thereon by 0.85 wt % (these are referred to as "particles D") were formed. 105.88 g of cube-like boehmite (in which moisture was contained by 15 wt %) was put into a beaker, dispersed into water, and deflocculated by acid. To a resultant thus obtained, 90 g of the particles D prepared in advance was added, and was dispersed thereinto by high-speed stirring. Thereafter, slurry thus obtained was dried and calcined, whereby powder ad-10 in which the particles D were coated with alumina was prepared. 173.4 g of this powder ad-10 and 1.6 g of boehmite alumina were added to a ball mill. Thereafter, 307.5 g of water and 17.5 g of a 10 wt % nitric acid solution were added to the ball mill, and the powder ad-10 was milled, whereby slurry with an average particle diameter of 3 μm (this is referred to as "slurry ad-10") was formed.

Next, rhodium nitrate was impregnated into a zirconium-cerium composite oxide with an average particle diameter of 20 nm, whereby particles B having rhodium supported thereon by 0.814% were prepared. 105.88 g of cube-like boehmite (in which moisture was contained by 15 wt %) was put into a beaker, dispersed into water, and deflocculated by acid. To a resultant thus obtained, 90 g of the particles B prepared in advance was added, and was dispersed thereinto by the high-speed stirring. Thereafter, slurry thus obtained was dried and calcined, whereby powder b-3 in which the particles B were coated with alumina was prepared. 172 g of this powder b-3 and 3 g of boehmite alumina were added to a ball mill. Thereafter, 307.5 g of water and 17.5 g of a 10 wt % nitric acid solution were further added to the ball mill, and the powder b-3 was milled, whereby slurry with an average particle diameter of 3 μm (this is referred to as "slurry b-3") was formed. The slurry ad-10 was coated by 141 g/L on a honeycomb carrier (capacity: 0.04 L) having a diameter of ø36 mm and 400 cells with a wall thickness of 6 mils, followed by drying, and thereafter, the slurry b-3 was coated by 59 g/L thereon, followed by drying. Thereafter, a resultant was calcined at 400° C., whereby a sample of Example 10 was obtained. The obtained sample of Example 10 is a catalyst that individually carries thereon Pt by 0.593 g/L and Rh by 0.236 g/L.

Example 11

Cerium-zirconium composite oxide particles with an average particle diameter of 30 nm were used as the first compounds 5. Dinitrodiamine Pt was impregnated into the particles, whereby cerium-zirconium composite oxide particles having Pt supported thereon by 0.85% (these are referred to as "particles A") were formed. 118.42 g of needle-like boehmite (100 nm×ø10 nm; aspect ratio: 10) (in which moisture was contained by 24%) was put into a beaker, dispersed into water, and deflocculated by acid. To a resultant thus obtained, 90 g of the particles A prepared in advance was added, and was dispersed thereinto by high-speed stirring. Thereafter, slurry thus obtained was dried and calcined, whereby powder a-11 in which the particles A were coated with alumina was prepared (only this needle-like boehmite was calcined, and a pore volume thereof was investigated, then the pore volume was 0.8 cm³/g). 173.4 g of this powder a-11 and 1.6 g of boehmite alumina were added to a ball mill. Thereafter, 307.5 g of water and 17.5 g of a 10% nitric acid solution were added to the ball mill, and the powder a-1 was milled, whereby slurry a-11 with an average particle diameter of 3 μm was formed.

Next, rhodium nitrate was impregnated into zirconium-lanthanum composite oxide particles with an average particle diameter of 20 nm, whereby particles B having rhodium supported thereon by 0.814 were prepared. 118.42 g of needle-like boehmite (100 nm×ø10 nm; aspect ratio: 10) (in which moisture was contained by 24%) was put into a beaker, dispersed into water, and deflocculated by acid. To a resultant thus obtained, 90 g of the particles B prepared in advance was added, and was dispersed thereinto by the high-speed stirring. Thereafter, slurry thus obtained was dried and calcined, whereby powder b-11 in which the particles B were coated with alumina was prepared. 172 g of this powder b-11 and 3 g of boehmite alumina were added to a ball mill. Thereafter, 307.5 g of water and 17.5 of a 10% nitric acid solution were further added to the ball mill, and the powder b-11 was milled, whereby slurry b-11 with an average particle diameter of 3 μm was formed. The slurry a-11 was coated by 141 g/L on a honeycomb carrier (capacity: 0.04 L) having a diameter of ø36 mm and 400 cells with a wall thickness of 6 mils, followed by drying, and thereafter, the slurry b-11 was coated by 59 g/L thereon, followed by drying. Thereafter, a resultant was calcined at 400° C., whereby a sample of Example 11 was obtained. The obtained sample of Example 11 is a catalyst that individually carries thereon Pt by 0.593 g/L and Rh by 0.236 g/L.

Example 12

Cerium-zirconium composite oxide particles with an average particle diameter of 30 nm were used as the first compounds 5. Dinitrodiamine Pt was impregnated into the ceria-zirconium particles, whereby cerium-zirconium composite oxide particles having Pt supported thereon by 0.85% (these are referred to as "particles A") were formed. 113.92 g of plate-like boehmite (10×20×20 nm; aspect ratio: 0.5) (in which moisture was contained by 21%) was put into a beaker, dispersed into water, and deflocculated by acid. To a resultant thus obtained, 90 g of the particles A prepared in advance was added, and was dispersed thereinto by high-speed stirring. Thereafter, slurry thus obtained was dried and calcined, whereby powder a-12 in which the particles A were coated with alumina was prepared (only this plate-like boehmite was calcined, and a pore volume thereof was investigated, then the pore volume was 0.85 cm³/g). 173.4 g of this powder a-12 and 1.6 g of boehmite alumina were added to a ball mill. Thereafter, 307.5 g of water and 17.5 g of a 10% nitric acid solution were added to the ball mill, and the powder a-12 was milled, whereby slurry a-12 with an average particle diameter of 3 μm was formed.

Next, rhodium nitrate was impregnated into zirconium-lanthanum composite oxide particles with an average particle diameter of 20 nm, whereby particles B having rhodium supported thereon by 0.814% were prepared. 113.92 g of plate-like boehmite (10×20×20 nm; aspect ratio: 0.5) (in which moisture was contained by 21%) was put into a beaker, dispersed into water, and deflocculated by acid. To a resultant thus obtained, 90 g of the particles B prepared in advance was added, and was dispersed thereinto by the high-speed stirring. Thereafter, slurry thus obtained was dried and calcined, whereby powder b-12 in which the particles B were coated with alumina was prepared. 172 g of this powder b-12 and 3 g of boehmite alumina were added to a ball mill. Thereafter, 307.5 g of water and 17.5 g of a 10% nitric acid solution were further added to the ball mill, and the powder b-12 was milled, whereby slurry b-12 with an average particle diameter of 3 μm was formed. The slurry a-12 was coated by 141 g/L on a honeycomb carrier (capacity: 0.04 L) having a diameter of ø36 mm and 400 cells with a wall thickness of 6 mils, followed by drying, and thereafter, the slurry b-12 was coated by 59 g/L thereon, followed by drying. Thereafter, a resultant was calcined at 400° C., whereby a sample of Example 12 was obtained. The obtained sample of Example 12 is a catalyst that individually carries thereon Pt by 0.593 g/L and Rh by 0.236 g/L.

Example 13

Cerium-zirconium composite oxide particles with an average particle diameter of 30 nm were used as the first compounds 5. Dinitrodiamine Pt was impregnated into the cerium-zirconium composite oxide particles, whereby cerium-zirconium composite oxide particles having Pt supported thereon by 0.85% (these are referred to as "particles A") were formed. 105.88 g of cube-like boehmite (20×20×20 nm; aspect ratio: 1) (in which moisture was contained by 15%) was put into a beaker, dispersed into water, and deflocculated by acid. To a resultant thus obtained, 90 g of the particles A prepared in advance was added, and was dispersed thereinto by high-speed stirring. Thereafter, slurry thus obtained was dried and calcined, whereby powder a-13 in which the particles A were coated with alumina was prepared (only this cube-like boehmite was calcined, and a pore volume thereof was investigated, then the pore volume was 0.9 cm$^3$/g). 173.4 g of this powder a-13 and 1.6 g of boehmite alumina were added to a ball mill. Thereafter, 307.5 g of water and 17.5 g of a 10% nitric acid solution were added to the ball mill, and the powder a-13 was milled, whereby slurry a-13 with an average particle diameter of 3 μm was formed.

Next, rhodium nitrate was impregnated into zirconium-lanthanum composite oxide particles with an average particle diameter of 20 nm, whereby particles B having rhodium supported thereon by 0.814% were prepared. 105.88 g of cube-like boehmite (20×20×20 nm; aspect ratio: 1) (in which moisture was contained by 15%) was put into a beaker, dispersed into water, and deflocculated by acid. To a resultant thus obtained, 90 g of the particles B prepared in advance was added, and was dispersed thereinto by the high-speed stirring. Thereafter, slurry thus obtained was dried and calcined, whereby powder b-13 in which the particles B were coated with alumina was prepared. 172 g of this powder b-13 and 3 g of boehmite alumina were added to a ball mill. Thereafter, 307.5 g of water and 17.5 g of a 10% nitric acid solution were further added to the ball mill, and the powder b-13 was milled, whereby slurry b-13 with an average particle diameter of 3 μm was formed. The slurry a-13 was coated by 141 g/L on a honeycomb carrier (capacity: 0.04 L) having a diameter of ø36 mm and 400 cells with a wall thickness of 6 mils, followed by drying, and thereafter, the slurry b-13 was coated by 59 g/L thereon, followed by drying. Thereafter, a resultant was calcined at 400° C., whereby a sample of Example 13 was obtained. The obtained sample of Example 13 is a catalyst that individually carries thereon Pt by 0.593 g/L and Rh by 0.236 g/L.

Example 14

Cerium-zirconium composite oxide particles with an average particle diameter of 30 nm were used as the first compounds 5. Dinitrodiamine Pt was impregnated into the cerium-zirconium composite oxide particles, whereby cerium-zirconium composite oxide particles having Pt supported thereon by 0.85% (these are referred to as "particles A") were formed. 102.27 g of prism-like boehmite (60×20×20 nm; aspect ratio: 3) (in which moisture was contained by 12%) was put into a beaker, dispersed into water, and deflocculated by acid. To a resultant thus obtained, 90 g of the particles A prepared in advance was added, and was dispersed thereinto by high-speed stirring. Thereafter, slurry thus obtained was dried and calcined, whereby powder a-14 in which the particles A were coated with alumina was prepared (only this prism-like boehmite was calcined, and a pore volume thereof was investigated, then the pore volume was 1.0 cm$^3$/g). 173.4 g of this powder a-14 and 1.6 g of boehmite alumina were added to a ball mill. Thereafter, 307.5 g of water and 17.5 g of a 10% nitric acid solution were added to the ball mill, and the powder a-14 was milled, whereby slurry a-14 with an average particle diameter of 3 μm was formed.

Next, rhodium nitrate was impregnated into zirconium-lanthanum composite oxide particles with an average particle diameter of 20 nm, whereby particles B having rhodium supported thereon by 0.814% were prepared. 102.27 g of prism-like boehmite (60×20×20 nm; aspect ratio: 3) (in which moisture was contained by 12%) was put into a beaker, dispersed into water, and deflocculated by acid. To a resultant thus obtained, 90 g of the particles B prepared in advance was added, and was dispersed thereinto by the high-speed stirring. Thereafter, slurry thus obtained was dried and calcined, whereby powder b-14 in which the particles B were coated with alumina was prepared. 172 g of this powder b-14 and 3 g of boehmite alumina were added to a ball mill. Thereafter, 307.5 g of water and 17.5 g of a 10% nitric acid solution were further added to the ball mill, and the powder b-14 was milled, whereby slurry b-14 with an average particle diameter of 3 μm was formed. The slurry a-14 was coated by 141 g/L on a honeycomb carrier (capacity: 0.04 L) having a diameter of ø36 mm and 400 cells with a wall thickness of 6 mils, followed by drying, and thereafter, the slurry b-14 was coated by 59 g/L thereon, followed by drying. Thereafter, a resultant was calcined at 400° C., whereby a sample of Example 14 was obtained. The obtained sample of Example 14 is a catalyst that individually carries thereon Pt by 0.593 g/L and Rh by 0.236 g/L.

Example 15

Cerium-zirconium composite oxide particles with an average particle diameter of 20 nm were used as the first compounds 5. Dinitrodiamine Pd was impregnated into the cerium-zirconium composite oxide particles, whereby cerium-zirconium composite oxide particles having Pd supported thereon by 0.85% (these are referred to as "particles C") were formed. 113.92 g of plate-like boehmite (10×20×20 nm; aspect ratio: 0.5) (in which moisture was contained by 21%) was put into a beaker, dispersed into water, and made acidic. To a resultant thus obtained, 90 g of the particles C prepared in advance was added, and was dispersed thereinto by high-speed stirring. Thereafter, slurry thus obtained was dried and calcined, whereby powder ad-15 in which the particles C were coated with alumina was prepared. 173.4 g of this powder ad-15 and 1.6 g of boehmite alumina were added to a ball mill. Thereafter, 307.5 g of water and 17.5 g of a 10% nitric acid solution were added to the ball mill, and the powder ad-15 was milled, whereby slurry ad-15 with an average particle diameter of 3 μm was formed.

Next, rhodium nitrate was impregnated into zirconium-lanthanum composite oxide particles with an average particle diameter of 20 nm, whereby particles B having rhodium supported thereon by 0.814% were prepared. 113.92 g of plate-like boehmite (10×20×20 nm; aspect ratio: 0.5) (in which moisture was contained by 21%) was put into a beaker, dispersed into water, and made acidic. To a resultant thus obtained, 90 g of the particles B prepared in advance was added, and was dispersed thereinto by the high-speed stirring.

Thereafter, slurry thus obtained was dried and calcined, whereby powder b-12 in which the particles B were coated with alumina was prepared. 172 g of this powder b-12 and 3 g of boehmite alumina were added to a ball mill. Thereafter, 307.5 g of water and 17.5 g of a 10% nitric acid solution were further added to the ball mill, and the powder b-12 was milled, whereby slurry b-12 with an average particle diameter of 3 μm was formed. The slurry ad-15 was coated by 141 g/L on a honeycomb carrier (capacity: 0.04 L) having a diameter of ø36 mm and 400 cells with a wall thickness of 6 mils, followed by drying, and thereafter, the slurry b-12 was coated by 59 g/L thereon, followed by drying. Thereafter, a resultant was calcined at 400° C., whereby a sample of Example 15 was obtained. The obtained sample of Example 15 is a catalyst that individually carries thereon Pd by 0.593 g/L and Rh by 0.236 g/L.

Example 16

Cerium-zirconium composite oxide particles with an average particle diameter of 20 nm were used as the first compounds 5. Dinitrodiamine Pd was impregnated into the particles, whereby cerium-zirconium composite oxide particles having Pd supported thereon by 0.85% (these are referred to as "particles C") were formed. 105.88 g of cube-like boehmite (20×20×20 nm; aspect ratio: 1) (in which moisture was contained by 15%) was put into a beaker, dispersed into water, and made acidic. To a resultant thus obtained, 90 g of the particles C prepared in advance was added, and was dispersed thereinto by high-speed stirring. Thereafter, slurry thus obtained was dried and calcined, whereby powder ad-16 in which the particles C were coated with alumina was prepared. 173.4 g of this powder ad-16 and 1.6 g of boehmite alumina were added to a ball mill. Thereafter, 307.5 g of water and 17.5 g of a 10% nitric acid solution were added to the ball mill, and the powder ad-16 was milled, whereby slurry ad-16 with an average particle diameter of 3 μm was formed.

Next, rhodium nitrate was impregnated into zirconium-lanthanum composite oxide particles with an average particle diameter of 20 nm, whereby particles B having rhodium supported thereon by 0.814% were prepared. 105.88 g of cube-like boehmite (20×20×20 nm; aspect ratio: 1) (in which moisture was contained by 15%) was put into a beaker, dispersed into water, and deflocculated by acid. To a resultant thus obtained, 90 g of the particles B prepared in advance was added, and was dispersed thereinto by the high-speed stirring. Thereafter, slurry thus obtained was dried and calcined, whereby powder b-13 in which the particles B were coated with alumina was prepared. 172 g of this powder b-13 and 3 g of boehmite alumina were added to a ball mill. Thereafter, 307.5 g of water and 17.5 g of a 10% nitric acid solution were further added to the ball mill, and the powder b-13 was milled, whereby slurry b-13 with an average particle diameter of 3 μm was formed. The slurry ad-16 was coated by 141 g/L on a honeycomb carrier (capacity: 0.04 L) having a diameter of ø36 mm and 400 cells with a wall thickness of 6 mils, followed by drying, and thereafter, the slurry b-13 was coated by 59 g/L thereon, followed by drying. Thereafter, a resultant was calcined at 400° C., whereby a sample of Example 16 was obtained. The obtained sample of Example 16 is a catalyst that individually carries thereon Pd by 0.593 g/L and Rh by 0.236 g/L.

Example 17

Cerium-zirconium composite oxide particles with a pore volume of 0.18 cm$^3$/g were used as the first compounds 5. Dinitrodiamine Pt was impregnated into the particles, whereby cerium-zirconium composite oxide particles having Pt supported thereon by 0.85% (these are referred to as "particles D1") were formed. 105.88 g of cube-like boehmite (20×20×20 nm) (in which moisture was contained by 15%) was put into a beaker, dispersed into water, and deflocculated by acid. To a resultant thus obtained, 90 g of the particles D1 prepared in advance was added, and was dispersed thereinto by high-speed stirring. Thereafter, slurry thus obtained was dried and calcined, whereby powder a-17 in which the particles D1 were coated with alumina was prepared. 173.4 g of this powder a-17 and 1.6 g of boehmite alumina were added to a ball mill. Thereafter, 307.5 g of water and 17.5 g of a 10% nitric acid solution were added to the ball mill, and the powder a-17 was milled, whereby slurry a-17 with an average particle diameter of 3 μm was formed.

Next, rhodium nitrate was impregnated into zirconium-lanthanum composite oxide particles with a pore volume of 0.28 cm$^3$/g, whereby particles E1 having rhodium supported thereon by 0.814% were prepared. 105.88 g of cube-like boehmite (20×20×20 nm) (in which moisture was contained by 15%) was put into a beaker, dispersed into water, and deflocculated by acid. To a resultant thus obtained, 90 g of the particles E1 prepared in advance was added, and was dispersed thereinto by the high-speed stirring. Thereafter, slurry thus obtained was dried and calcined, whereby powder b-17 in which the particles E1 were coated with alumina was prepared. 172 g of this powder b-17 and 3 g of boehmite alumina were added to a ball mill. Thereafter, 307.5 g of water and 17.5 g of a 10% nitric acid solution were further added to the ball mill, and the powder b-17 was milled, whereby slurry b-17 with an average particle diameter of 3 μm was formed. The slurry a-17 was coated by 141 g/L on a honeycomb carrier (capacity: 0.04 L) having a diameter of ø36 mm and 400 cells with a wall thickness of 6 mils, followed by drying, and thereafter, the slurry b-17 was coated by 59 g/L thereon, followed by drying. Thereafter, a resultant was calcined at 400° C., whereby a sample of Example 17 was obtained. The obtained sample of Example 17 is a catalyst that individually carries thereon Pt by 0.593 g/L and Rh by 0.236 g/L.

Example 18

Cerium-zirconium composite oxide particles with a pore volume of 0.28 cm$^3$/g were used as the first compounds 5. Dinitrodiamine Pt was impregnated into the particles, whereby cerium-zirconium composite oxide particles having Pt supported thereon by 0.85% (these are referred to as "particles D2") were formed. 105.88 g of cube-like boehmite (20×20×20 nm) (in which moisture was contained by 15%) was put into a beaker, dispersed into water, and deflocculated by acid. To a resultant thus obtained, 90 g of the particles D2 prepared in advance was added, and was dispersed thereinto by high-speed stirring. Thereafter, slurry thus obtained was dried and calcined, whereby powder a-18 in which the particles D2 were coated with alumina was prepared. 173.4 g of this powder a-18 and 1.6 g of boehmite alumina were added to a ball mill. Thereafter, 307.5 g of water and 17.5 g of a 10% nitric acid solution were added to the ball mill, and the powder a-18 was milled, whereby slurry a-18 with an average particle diameter of 3 μm was formed.

Next, rhodium nitrate was impregnated into zirconium-lanthanum composite oxide particles with a pore volume of 0.30 cm$^3$/g, whereby particles E2 having rhodium supported thereon by 0.814% were prepared. 105.88 g of cube-like boehmite (20×20×20 nm) (in which moisture was contained by 15%) was put into a beaker, dispersed into water, and deflocculated by acid. To a resultant thus obtained, 90 g of the particles E2 prepared in advance was added, and was dispersed thereinto by the high-speed stirring. Thereafter, slurry thus obtained was dried and calcined, whereby powder b-18 in which the particles E2 were coated with alumina was prepared. 172 g of this powder b-18 and 3 g of boehmite alumina were added to a ball mill. Thereafter, 307.5 g of water and 17.5 g of a 10% nitric acid solution were further added to the ball mill, and the powder b-18 was milled, whereby slurry b-18 with an average particle diameter of 3 μm was formed. The slurry a-18 was coated by 141 g/L on a honeycomb carrier (capacity: 0.04 L) having a diameter of ø36 mm and 400 cells with a wall thickness of 6 mils, followed by drying, and thereafter, the slurry b-18 was coated by 59 g/L thereon, followed by drying. Thereafter, a resultant was calcined at 400° C., whereby a sample of Example 18 was obtained. The obtained sample of Example 18 is a catalyst that individually carries thereon Pt by 0.593 g/L and Rh by 0.236 g/L.

Example 19

Cerium-zirconium composite oxide particles with a pore volume of 0.30 cm$^3$/g were used as the first compounds 5. Dinitrodiamine Pt was impregnated into the particles, whereby cerium-zirconium composite oxide particles having Pt supported thereon by 0.85% (these are referred to as "particles D3") were formed. 105.88 g of cube-like boehmite (20×20×20 nm) (in which moisture was contained by 15%) was put into a beaker, dispersed into water, and deflocculated by acid. To a resultant thus obtained, 90 g of the particles D3 prepared in advance was added, and was dispersed thereinto by high-speed stirring. Thereafter, slurry thus obtained was dried and calcined, whereby powder a-19 in which the particles D3 were coated with alumina was prepared. 173.4 g of this powder a-19 and 1.6 g of boehmite alumina were added to a ball mill. Thereafter, 307.5 g of water and 17.5 g of a 10% nitric acid solution were added to the ball mill, and the powder a-19 was milled, whereby slurry a-19 with an average particle diameter of 3 μm was formed.

Next, rhodium nitrate was impregnated into zirconium-lanthanum composite oxide particles with a pore volume of 0.32 cm$^3$/g, whereby particles E3 having rhodium supported thereon by 0.814% were prepared. 105.88 g of cube-like boehmite (20×20×20 nm) (in which moisture was contained by 15%) was put into a beaker, dispersed into water, and deflocculated by acid. To a resultant thus obtained, 90 g of the particles E3 prepared in advance was added, and was dispersed thereinto by the high-speed stirring. Thereafter, slurry thus obtained was dried and calcined, whereby powder b-19 in which the particles E3 were coated with alumina was prepared. 172 g of this powder b-19 and 3 g of boehmite alumina were added to a ball mill. Thereafter, 307.5 g of water and 17.5 g of a 10% nitric acid solution were further added to the ball mill, and the powder b-19 was milled, whereby slurry b-19 with an average particle diameter of 3 μm was formed. The slurry a-19 was coated by 141 g/L on a honeycomb carrier (capacity: 0.04 L) having a diameter of ø36 mm and 400 cells with a wall thickness of 6 mils, followed by drying, and thereafter, the slurry b-19 was coated by 59 g/L thereon, followed by drying. Thereafter, a resultant was calcined at 400° C., whereby a sample of Example 19 was obtained. The obtained sample of Example 19 is a catalyst that individually carries thereon Pt by 0.593 g/L and Rh by 0.236 g/L.

Example 20

Cerium-zirconium composite oxide particles in which cerium occupied 74% and zirconium occupied 26% in terms of composition were used as the first compounds 5. Dinitrodiamine Pt was impregnated into the particles, whereby cerium-zirconium composite oxide particles having Pt supported thereon by 0.85% (these are referred to as "particles F1") were formed. 105.88 g of cube-like boehmite (20×20×20 nm) (in which moisture was contained by 15%) was put into a beaker, dispersed into water, and deflocculated by acid. To a resultant thus obtained, 90 g of the particles F1 prepared in advance was added, and was dispersed thereinto by high-speed stirring. Thereafter, slurry thus obtained was dried and calcined, whereby powder a-20 in which the particles F1 were coated with alumina was prepared. 173.4 g of this powder a-20 and 1.6 g of boehmite alumina were added to a ball mill. Thereafter, 307.5 g of water and 17.5 g of a 10% nitric acid solution were added to the ball mill, and the powder a-20 was milled, whereby slurry a-20 with an average particle diameter of 3 μm was formed.

Next, rhodium nitrate was impregnated into zirconium-lanthanum composite oxide particles in which zirconium occupied 95% and lanthanum occupied 5% in terms of composition, whereby particles G1 having rhodium supported thereon by 0.814% were prepared. 105.88 g of cube-like boehmite (20×20×20 nm) (in which moisture was contained by 15%) was put into a beaker, dispersed into water, and deflocculated by acid. To a resultant thus obtained, 90 g of the particles G1 prepared in advance was added, and was dispersed thereinto by the high-speed stirring. Thereafter, slurry thus obtained was dried and calcined, whereby powder b-20 in which the particles G1 were coated with alumina was prepared. 172 g of this powder b-20 and 3 g of boehmite alumina were added to a ball mill. Thereafter, 307.5 g of water and 17.5 g of a 10% nitric acid solution were further added to the ball mill, and the powder b-20 was milled, whereby slurry b-20 with an average particle diameter of 3 μm was formed. The slurry a-20 was coated by 141 g/L on a honeycomb carrier (capacity: 0.04 L) having a diameter of ø36 mm and 400 cells with a wall thickness of 6 mils, followed by drying, and thereafter, the slurry b-20 was coated by 59 g/L thereon, followed by drying. Thereafter, a resultant was calcined at 400° C., whereby a sample of Example 20 was obtained. The obtained sample of Example 20 is a catalyst that individually carries thereon Pt by 0.593 g/L and Rh by 0.236 g/L.

Example 21

Cerium-zirconium composite oxide particles in which cerium occupied 78% and zirconium occupied 22% in terms of composition were used as the first compounds 5. Dinitrodiamine Pt was impregnated into the particles, whereby cerium-zirconium composite oxide particles having Pt supported thereon by 0.85% (these are referred to as "particles F2") were formed. 105.88 g of cube-like boehmite (20×20×20 nm) (in which moisture was contained by 15%) was put into a beaker, dispersed into water, and deflocculated by acid. To a resultant thus obtained, 90 g of the particles F2 prepared in advance was added, and was dispersed thereinto by high-speed stirring. Thereafter, slurry thus obtained was dried and calcined, whereby powder a-21 in which the particles F2 were coated with alumina was prepared. 173.4 g of this powder a-21 and 1.6 g of boehmite alumina were added to a ball mill. Thereafter, 307.5 g of water and 17.5 g of a 10% nitric acid solution were added to the ball mill, and the powder a-21 was milled, whereby slurry a-21 with an average particle diameter of 3 μm was formed.

Next, rhodium nitrate was impregnated into zirconium-lanthanum composite oxide particles in which zirconium occupied 97% and lanthanum occupied 3% in terms of composition, whereby particles G2 having rhodium supported thereon by 0.814% were prepared. 105.88 g of cube-like boehmite (20×20×20 nm) (in which moisture was contained by 15%) was put into a beaker, dispersed into water, and deflocculated by acid. To a resultant thus obtained, 90 g of the particles G2 prepared in advance was added, and was dispersed thereinto by the high-speed stirring. Thereafter, slurry thus obtained was dried and calcined, whereby powder b-21 in which the particles G2 were coated with alumina was prepared. 172 g of this powder b-21 and 3 g of boehmite alumina were added to a ball mill. Thereafter, 307.5 g of water and 17.5 g of a 10% nitric acid solution were further added to the ball mill, and the powder b-21 was milled, whereby slurry b-21 with an average particle diameter of 3 µm was formed. The slurry a-21 was coated by 141 g/L on a honeycomb carrier (capacity: 0.04 L) having a diameter of ø36 mm and 400 cells with a wall thickness of 6 mils, followed by drying, and thereafter, the slurry b-21 was coated by 59 g/L thereon, followed by drying. Thereafter, a resultant was calcined at 400° C., whereby a sample of Example 21 was obtained. The obtained sample of Example 21 is a catalyst that individually carries thereon Pt by 0.593 g/L and Rh by 0.236 g/L.

Example 22

Cerium-zirconium composite oxide particles in which cerium occupied 80% and zirconium occupied 20% in terms of composition were used as the first compounds 5. Dinitrodiamine Pt was impregnated into the particles, whereby cerium-zirconium composite oxide particles having Pt supported thereon by 0.85% (these are referred to as "particles F3") were formed. 105.88 g of cube-like boehmite (20×20×20 nm) (in which moisture was contained by 15%) was put into a beaker, dispersed into water, and deflocculated by acid. To a resultant thus obtained, 90 g of the particles F3 prepared in advance was added, and was dispersed thereinto by high-speed stirring. Thereafter, slurry thus obtained was dried and calcined, whereby powder a-22 in which the particles F3 were coated with alumina was prepared. 173.4 g of this powder a-22 and 1.6 g of boehmite alumina were added to a ball mill. Thereafter, 307.5 g of water and 17.5 g of a 10% nitric acid solution were added to the ball mill, and the powder a-22 was milled, whereby slurry a-22 with an average particle diameter of 3 µm was formed.

Next, rhodium nitrate was impregnated into zirconium-lanthanum composite oxide particles in which zirconium occupied 99% and lanthanum occupied 1% in terms of composition, whereby particles G3 having rhodium supported thereon by 0.814% were prepared. 105.88 g of cube-like boehmite (20×20×20 nm) (in which moisture was contained by 15%) was put into a beaker, dispersed into water, and deflocculated by acid. To a resultant thus obtained, 90 g of the particles G3 prepared in advance was added, and was dispersed thereinto by the high-speed stirring. Thereafter, slurry thus obtained was dried and calcined, whereby powder b-22 in which the particles G3 were coated with alumina was prepared. 172 g of this powder b-22 and 3 g of boehmite alumina were added to a ball mill. Thereafter, 307.5 g of water and 17.5 g of a 10% nitric acid solution were further added to the ball mill, and the powder b-22 was milled, whereby slurry b-22 with an average particle diameter of 3 µm was formed. The slurry a-22 was coated by 141 g/L on a honeycomb carrier (capacity: 0.04 L) having a diameter of ø36 mm and 400 cells with a wall thickness of 6 mils, followed by drying, and thereafter, the slurry b-22 was coated by 59 g/L thereon, followed by drying. Thereafter, a resultant was calcined at 400° C., whereby a sample of Example 22 was obtained. The obtained sample of Example 22 is a catalyst that individually carries thereon Pt by 0.593 g/L and Rh by 0.236 g/L.

Example 23

Cerium-zirconium composite oxide particles with an average particle diameter of 30 nm were used as the first compounds 5. Dinitrodiamine Pt was impregnated into the particles, whereby cerium-zirconium composite oxide particles having Pt supported thereon by 0.85% (these are referred to as "particles A") were formed. 105.04 g of needle-like boehmite (ø10 nm×100 nm) (in which moisture was contained by 24.6%) was put into a beaker into which water was poured, cerium nitrate was added thereto so that an amount thereof as cerium oxide could be 4.5 g, and zirconyl nitrate was dispersed into the water so that an amount thereof as zirconium oxide could be 6.3 g. To a resultant thus obtained, 90 g of the particles A prepared in advance was added, and was dispersed thereinto by high-speed stirring. Thereafter, slurry thus obtained was dried and calcined, whereby powder a-23 in which the particles A were coated with alumina was prepared. 173.4 g of this powder a-23 and 1.6 g of boehmite alumina were added to a ball mill. Thereafter, 307.5 g of water and 17.5 g of a 10% nitric acid solution were added to the ball mill, and the powder a-23 was milled, whereby slurry a-23 with an average particle diameter of 3 µm was formed.

Next, rhodium nitrate was impregnated into zirconium-lanthanum composite oxide particles with an average particle diameter of 20 nm, whereby particles B having rhodium supported thereon by 0.814% were prepared. 118.42 g of needle-like boehmite (in which moisture was contained by 24%) was put into a beaker, dispersed into water, and deflocculated by acid. To a resultant thus obtained, 90 g of the particles B prepared in advance was added, and was dispersed thereinto by the high-speed stirring. Thereafter, slurry thus obtained was dried and calcined, whereby powder b-11 in which the particles B were coated with alumina was prepared. 172 g of this powder b-11 and 3 g of boehmite alumina were added to a ball mill. Thereafter, 307.5 g of water and 17.5 g of a 10% nitric acid solution were further added to the ball mill, and the powder b-11 was milled, whereby slurry b-11 with an average particle diameter of 3 µm was formed. The slurry a-23 was coated by 141 g/L on a honeycomb carrier (capacity: 0.04 L) having a diameter of ø36 mm and 400 cells with a wall thickness of 6 mils, followed by drying, and thereafter, the slurry b-11 was coated by 59 g/L thereon, followed by drying. Thereafter, a resultant was calcined at 400° C., whereby a sample of Example 23 was obtained. The obtained sample of Example 23 is a catalyst that individually carries thereon Pt by 0.593 g/L and Rh by 0.236 g/L.

Example 24

Cerium-zirconium composite oxide particles with an average particle diameter of 30 nm were used as the first compounds 5. Dinitrodiamine Pt was impregnated into the particles, whereby cerium-zirconium composite oxide particles having Pt supported thereon by 0.85% (these are referred to as "particles A") were formed. 101.46 g of needle-like boehmite (ø10 nm×100 nm) (in which moisture was contained by 24.6%) was put into a beaker into which water was poured, cerium nitrate was added thereto so that an amount thereof as cerium oxide could be 9 g, and zirconyl nitrate was dispersed into the water so that an amount thereof as zirconium oxide could be 4.5 g. To a resultant thus obtained, 90 g of the particles A prepared in advance was added, and was dispersed thereinto by high-speed stirring. Thereafter, slurry thus obtained was dried and calcined, whereby powder a-24 in which the particles A were coated with alumina was prepared. 173.4 g of this powder a-24 and 1.6 g of boehmite alumina were added to a ball mill. Thereafter, 307.5 g of water and 17.5 g of a 10% nitric acid solution were added to the ball mill, and the powder a-24 was milled, whereby slurry a-24 with an average particle diameter of 3 μm was formed.

Next, rhodium nitrate was impregnated into zirconium-lanthanum composite oxide particles with an average particle diameter of 20 nm, whereby particles B having rhodium supported thereon by 0.814% were prepared. 118.42 g of needle-like boehmite (in which moisture was contained by 24%) was put into a beaker, dispersed into water, and deflocculated by acid. To a resultant thus obtained, 90 g of the particles B prepared in advance was added, and was dispersed thereinto by the high-speed stirring. Thereafter, slurry thus obtained was dried and calcined, whereby powder b-11 in which the particles B were coated with alumina was prepared. 172 g of this powder b-11 and 3 g of boehmite alumina were added to a ball mill. Thereafter, 307.5 g of water and 17.5 g of a 10% nitric acid solution were further added to the ball mill, and the powder b-11 was milled, whereby slurry b-11 with an average particle diameter of 3 μm was formed. The slurry a-24 was coated by 141 g/L on a honeycomb carrier (capacity: 0.04 L) having a diameter of ø36 mm and 400 cells with a wall thickness of 6 mils, followed by drying, and thereafter, the slurry b-11 was coated by 59 g/L thereon, followed by drying. Thereafter, a resultant was calcined at 400° C., whereby a sample of Example 24 was obtained. The obtained sample of Example 24 is a catalyst that individually carries thereon Pt by 0.593 g/L and Rh by 0.236 g/L.

Example 25

Cerium-zirconium composite oxide particles with an average particle diameter of 30 nm were used as the first compounds 5. Dinitrodiamine Pt was impregnated into the particles, whereby cerium-zirconium composite oxide particles having Pt supported thereon by 0.85% (these are referred to as "particles A") were formed. 97.88 g of needle-like boehmite (ø10 nm×100 nm) (in which moisture was contained by 24.6%) was put into a beaker into which water was poured, cerium nitrate was added thereto so that an amount thereof as cerium oxide could be 13.5 g, and zirconyl nitrate was dispersed into the water so that an amount thereof as zirconium oxide could be 2.7 g. To a resultant thus obtained, 90 g of the particles A prepared in advance was added, and was dispersed thereinto by high-speed stirring. Thereafter, slurry thus obtained was dried and calcined, whereby powder a-25 in which the particles A were coated with alumina was prepared. 173.4 g of this powder a-25 and 1.6 g of boehmite alumina were added to a ball mill. Thereafter, 307.5 g of water and 17.5 g of a 10% nitric acid solution were added to the ball mill, and the powder a-25 was milled, whereby slurry a-25 with an average particle diameter of 3 μm was formed.

Next, rhodium nitrate was impregnated into zirconium-lanthanum composite oxide particles with an average particle diameter of 20 nm, whereby particles B having rhodium supported thereon by 0.814% were prepared. 118.42 g of needle-like boehmite (in which moisture was contained by 24%) was put into a beaker, dispersed into water, and deflocculated by acid. To a resultant thus obtained, 90 g of the particles B prepared in advance was added, and was dispersed thereinto by the high-speed stirring. Thereafter, slurry thus obtained was dried and calcined, whereby powder b-11 in which the particles B were coated with alumina was prepared. 172 g of this powder b-11 and 3 g of boehmite alumina were added to a ball mill. Thereafter, 307.5 g of water and 17.5 g of a 10% nitric acid solution were further added to the ball mill, and the powder b-11 was milled, whereby slurry b-11 with an average particle diameter of 3 μm was formed. The slurry a-25 was coated by 141 g/L on a honeycomb carrier (capacity: 0.04 L) having a diameter of ø36 mm and 400 cells with a wall thickness of 6 mils, followed by drying, and thereafter, the slurry b-11 was coated by 59 g/L thereon, followed by drying. Thereafter, a resultant was calcined at 400° C., whereby a sample of Example 25 was obtained. The obtained sample of Example 25 is a catalyst that individually carries thereon Pt by 0.593 g/L and Rh by 0.236 g/L.

Example 26

Cerium-zirconium composite oxide particles with an average particle diameter of 30 nm were used as the first compounds 5. Dinitrodiamine Pt was impregnated into the cerium-zirconium composite oxide particles, and a resultant was calcined at 700° C. for two hours, whereby cerium-zirconium composite oxide particles having Pt supported thereon by 0.85% (these are referred to as "particles I1") were formed. A degree of dispersion of Pt in the particles I1 was 50%. 105.88 g of cube-like boehmite (20×20×20 nm) (in which moisture was contained by 15%) was put into a beaker, dispersed into water, and deflocculated by acid. To a resultant thus obtained, 90 g of the particles 11 prepared in advance was added, and was dispersed thereinto by high-speed stirring. Thereafter, slurry thus obtained was dried and calcined, whereby powder a-26 in which the particles 11 were coated with alumina was prepared. A degree of dispersion of Pt in the particles was 35%. 173.4 g of this powder a-26 and 1.6 g of boehmite alumina were added to a ball mill. Thereafter, 307.5 g of water and 17.5 g of a 10% nitric acid solution were added to the ball mill, and the powder a-26 was milled, whereby slurry a-26 with an average particle diameter of 3 μm was formed.

Next, rhodium nitrate was impregnated into zirconium-lanthanum composite oxide particles with an average particle diameter of 20 nm, and a resultant was calcined at 400° C. for one hour, whereby zirconium-lanthanum composite oxide particles having rhodium supported thereon by 0.814% (these are referred to as "particles J1") were prepared. A degree of dispersion of Rh in the particles J1 was 56%. 105.88 g of cube-like boehmite (in which moisture was contained by 15%) was put into a beaker, dispersed into water, and deflocculated by acid. To a resultant thus obtained, 90 g of the particles J1 prepared in advance was added, and was dispersed thereinto by the high-speed stirring. Thereafter, slurry thus obtained was dried and calcined, whereby powder b-26 in which the particles J1 were coated with alumina was prepared. A degree of dispersion of Rh in the powder was 38%. 172 g of this powder b-26 and 3 g of boehmite alumina were added to a ball mill. Thereafter, 307.5 g of water and 17.5 g of a 10% nitric acid solution were further added to the ball mill, and the powder b-26 was milled, whereby slurry b-26 with an average particle diameter of 3 μm was formed. The slurry a-26 was coated by 141 g/L on a honeycomb carrier (capacity: 0.04 L) having a diameter of ø36 mm and 400 cells with a wall thickness of 6 mils, followed by drying, and thereafter, the slurry b-26 was coated by 59 g/L thereon, followed by drying. Thereafter, a resultant was calcined at 400° C., whereby a sample of Example 26 was obtained. The obtained sample of Example 26 is a catalyst that individually carries thereon Pt by 0.593 g/L and Rh by 0.236 g/L.

Example 27

Cerium-zirconium composite oxide particles with an average particle diameter of 30 nm were used as the first compounds 5. Dinitrodiamine Pt was impregnated into the cerium-zirconium composite oxide particles, and a resultant was calcined at 600° C. for two hours, whereby cerium-zirconium composite oxide particles having Pt supported thereon by 0.85% (these are referred to as "particles 12") were formed. A degree of dispersion of Pt in the particles 12 was 50%. 105.88 g of cube-like boehmite (20×20×20 nm) (in which moisture was contained by 15%) was put into a beaker, dispersed into water, and deflocculated by acid. To a resultant thus obtained, 90 g of the particles 12 prepared in advance was added, and was dispersed thereinto by high-speed stirring. Thereafter, slurry thus obtained was dried and calcined, whereby powder a-27 in which the particles 12 were coated with alumina was prepared. A degree of dispersion of Pt in the particles a-27 was 50%. 173.4 g of this powder a-27 and 1.6 g of boehmite alumina were added to a ball mill. Thereafter, 307.5 g of water and 17.5 g of a 10% nitric acid solution were added to the ball mill, and the powder a-27 was milled, whereby slurry a-27 with an average particle diameter of 3 μm was formed.

Next, rhodium nitrate was impregnated into zirconium-lanthanum composite oxide particles with an average particle diameter of 20 nm, and a resultant was calcined at 400° C. for one hour, whereby the particles J1 having rhodium supported thereon by 0.814% were prepared. A degree of dispersion of Rh in the particles J1 was 56%. 105.88 g of cube-like boehmite (in which moisture was contained by 15%) was put into a beaker, dispersed into water, and deflocculated by acid. To a resultant thus obtained, 90 g of the particles J1 prepared in advance was added, and was dispersed thereinto by the high-speed stirring. Thereafter, slurry thus obtained was dried and calcined, whereby powder b-27 in which the particles J1 were coated with alumina was prepared. A degree of dispersion of Rh in the powder b-27 was 38%. 172 g of this powder b-27 and 3 g of boehmite alumina were added to a ball mill. Thereafter, 307.5 g of water and 17.5 g of a 10% nitric acid solution were further added to the ball mill, and the powder b-27 was milled, whereby slurry b-27 with an average particle diameter of 3 μm was formed. The slurry a-27 was coated by 141 g/L on a honeycomb carrier (capacity: 0.04 L) having a diameter of ø36 mm and 400 cells with a wall thickness of 6 mils, followed by drying, and thereafter, the slurry b-27 was coated by 59 g/L thereon, followed by drying. Thereafter, a resultant was calcined at 400° C., whereby a sample of Example 27 was obtained. The obtained sample of Example 27 is a catalyst that individually carries thereon Pt by 0.593 g/L and Rh by 0.236 g/L.

Example 28

Cerium-zirconium composite oxide particles with an average particle diameter of 30 nm were used as the first compounds 5. Dinitrodiamine Pt was impregnated into the cerium-zirconium composite oxide particles, and a resultant was calcined at 400° C. for one hour, whereby cerium-zirconium composite oxide particles having Pt supported thereon by 0.85% (these are referred to as "particles 13") were formed. A degree of dispersion of Pt in the particles 13 was 100%. 105.88 g of cube-like boehmite (20×20×20 nm) (in which moisture was contained by 15%) was put into a beaker, dispersed into water, and deflocculated by acid. To a resultant thus obtained, 90 g of the particles 13 prepared in advance was added, and was dispersed thereinto by high-speed stirring. Thereafter, slurry thus obtained was dried and calcined, whereby powder a-28 in which the particles 13 were coated with alumina was prepared. A degree of dispersion of Pt in the powder was 80%. 173.4 g of this powder a-28 and 1.6 g of boehmite alumina were added to a ball mill. Thereafter, 307.5 g of water and 17.5 g of a 10% nitric acid solution were added to the ball mill, and the powder a-28 was milled, whereby slurry a-28 with an average particle diameter of 3 μm was formed.

Next, rhodium nitrate was impregnated into zirconium-lanthanum composite oxide particles with an average particle diameter of 20 nm, and a resultant was calcined at 400° C. for one hour, whereby the particles J1 having rhodium supported thereon by 0.814% were prepared. A degree of dispersion of Rh in the particles J1 was 56%. 105.88 g of cube-like boehmite (in which moisture was contained by 15%) was put into a beaker, dispersed into water, and deflocculated by acid. To a resultant thus obtained, 90 g of the particles J1 prepared in advance was added, and was dispersed thereinto by the high-speed stirring. Thereafter, slurry thus obtained was dried and calcined, whereby powder b-28 in which the particles J1 were coated with alumina was prepared. A degree of dispersion of Rh in the powder b-28 was 38%. 172 g of this powder b-28 and 3 g of boehmite alumina were added to a ball mill. Thereafter, 307.5 g of water and 17.5 g of a 10% nitric acid solution were further added to the ball mill, and the powder b-28 was milled, whereby slurry b-28 with an average particle diameter of 3 μm was formed. The slurry a-28 was coated by 141 g/L on a honeycomb carrier (capacity: 0.04 L) having a diameter of ø36 mm and 400 cells with a wall thickness of 6 mils, followed by drying, and thereafter, the slurry b-28 was coated by 59 g/L thereon, followed by drying. Thereafter, a resultant was calcined at 400° C., whereby a sample of Example 28 was obtained. The obtained sample of Example 28 is a catalyst that individually carries thereon Pt by 0.593 g/L and Rh by 0.236 g/L.

Comparative example 1

$CeO_2$ particles with an average particle diameter of 30 nm were used as the first compounds 5. Dinitrodiamine Pt was impregnated into the $CeO_2$ particles, whereby $CeO_2$ particles having Pt supported thereon by 0.85% (these are referred to as "ceria particles A") were formed. Aluminum isopropoxide equivalent to 90 g of $Al_2O_3$ was dissolved into 2-methyl-2,4-pentanediol. To a solution thus obtained, 90 g of the ceria particles A was added, and water was further added thereto, whereby hydrolysis was performed therefor. The water and organic matter such as the 2-methyl-2,4-pentanediol were evaporated and dried, followed by calcining, whereby powder c-1 in which the particles A were coated with alumina was prepared. An average particle diameter of the alumina was 7 to 8 nm. 173.4 g of this powder c-1 and 1.6 g of boehmite alumina were added to a ball mill. Thereafter, 307.5 g of water and 17.5 g of a 10 wt % nitric acid solution were added to the ball mill, and the powder c-1 was milled, whereby slurry with an average particle diameter of 3 μm (this is referred to as "slurry c-1") was formed.

Next, rhodium nitrate was impregnated into zirconium-cerium composite oxide particles with an average particle diameter of 20 nm, whereby particles B having rhodium supported thereon by 0.814% were prepared. 562.5 g of zirconia sol with an average particle diameter of 8 nm (in which moisture was contained by 84%) was put into a beaker, and 90 g of the particles B prepared in advance was added thereto, and was dispersed thereinto by high-speed stirring. Thereafter, slurry thus obtained was dried and calcined, whereby powder cb-1 in which the particles B were coated with alumina was prepared. 172 g of this powder cb-1 and 3 g of boehmite alumina were added to a ball mill. Thereafter, 307.5 g of water and 17.5 g of a 10 wt % nitric acid solution were further added to the ball mill, and the powder cb-1 was milled, whereby slurry with an average particle diameter of 3 μm (this is referred to as "slurry cb-1") was formed. The slurry c-1 was coated by 141 g/L on a honeycomb carrier (capacity: 0.04 L) having a diameter of ø36 mm and 400 cells with a wall thickness of 6 mils, followed by drying, and thereafter, the slurry cb-1 was coated by 59 g/L thereon, followed by drying. Thereafter, a resultant was calcined at 400° C., whereby a sample of Comparative example 1 was obtained. The obtained sample of Comparative example 1 is a catalyst that individually carries thereon Pt by 0.593 g/L and Rh by 0.236 g/L.

Comparative example 2

$CeO_2$ particles with an average particle diameter of 30 nm were used as the first compounds 5. Dinitrodiamine Pt was impregnated into the $CeO_2$ particles, whereby $CeO_2$ particles having Pt supported thereon by 0.85% (these are referred to as "ceria particles A") were formed. 90.9 g of alumina nanoparticles with an average particle diameter of 110 nm (in which moisture was contained by 1 wt %) was put into a beaker, dispersed into water, and made acidic. To a resultant thus obtained, 90 g of the ceria particles A prepared in advance was added, and was dispersed thereinto by high-speed stirring. Thereafter, slurry thus obtained was dried and calcined, whereby powder c-2 in which the ceria particles A were coated with alumina was prepared. 173.4 g of this powder c-2 and 1.6 g of boehmite alumina were added to a ball mill. Thereafter, 307.5 g of water and 17.5 g of a 10 wt % nitric acid solution were added to the ball mill, and the powder c-2 was milled, whereby slurry with an average particle diameter of 3 μm (this is referred to as "slurry c-2") was formed.

Next, rhodium nitrate was impregnated into zirconium-cerium composite oxide particles with an average particle diameter of 20 nm, whereby particles B having rhodium supported thereon by 0.814% were prepared. 90.9 g of alumina nanoparticles with an average particle diameter of 110 nm (in which moisture was contained by 1%) was put into a beaker, dispersed into water, and made acidic. To a resultant thus obtained, 90 g of the particles B prepared in advance was added, and was dispersed thereinto by high-speed stirring. Thereafter, slurry thus obtained was dried and calcined, whereby powder cb-2 in which the particles B were coated with alumina was prepared. 172 g of this powder cb-2 and 3 g of boehmite alumina were added to a ball mill. Thereafter, 307.5 g of water and 17.5 g of a 10 wt % nitric acid solution were further added to the ball mill, and the powder cb-2 was milled, whereby slurry with an average particle diameter of 3 μm (this is referred to as "slurry cb-2") was formed. The slurry c-2 was coated by 141 g/L on a honeycomb carrier (capacity: 0.04 L) having a diameter of ø36 mm and 400 cells with a wall thickness of 6 mils, followed by drying, and thereafter, the slurry cb-2 was coated by 59 g/L thereon, followed by drying. Thereafter, a resultant was calcined at 400° C., whereby a sample of Comparative example 2 was obtained. The obtained sample of Comparative example 2 is a catalyst that individually carries thereon Pt by 0.593 g/L and Rh by 0.236 g/L.

Comparative example 3

Cerium-zirconium composite oxide particles with an average particle diameter of 30 nm were used as the first compounds 5. Dinitrodiamine Pt was impregnated into the cerium-zirconium composite oxide particles, whereby cerium-zirconium composite oxide particles having Pt supported thereon by 0.85% (these are referred to as "particles A") were formed. Aluminum isopropoxide equivalent to 90 g of $Al_2O_3$ was dissolved into 2-methyl-2,4-pentanediol. To a solution thus obtained, 90 g of the particles A was added, and water was further added thereto, whereby hydrolysis was performed therefor. The water and organic matter such as the 2-methyl-2,4-pentanediol were evaporated and dried, followed by calcining, whereby powder c-3 in which the particles A were coated with alumina was prepared. An average particle diameter of the alumina was 7 to 8 nm. 173.4 g of this powder c-3 and 1.6 g of boehmite alumina were added to a ball mill. Thereafter, 307.5 g of water and 17.5 g of a 10% nitric acid solution were added to the ball mill, and the powder c-3 was milled, whereby slurry c-3 with an average particle diameter of 3 μm was formed.

Next, rhodium nitrate was impregnated into zirconium-lanthanum composite oxide particles with an average particle diameter of 20 nm, whereby particles B having rhodium supported thereon by 0.814% were prepared. Aluminum isopropoxide equivalent to 90 g of $Al_2O_3$ was dissolved into 2-methyl-2,4-pentanediol. To a solution thus obtained, 90 g of the particles B was added, and water was further added thereto, whereby hydrolysis was performed therefor. The water and organic matter such as the 2-methyl-2,4-pentanediol were evaporated and dried, followed by calcining, whereby powder cb-3 in which the particles B were coated with alumina was prepared. 172 g of this powder cb-3 and 3 g of boehmite alumina were added to a ball mill. Thereafter, 307.5 g of water and 17.5 g of a 10% nitric acid solution were further added to the ball mill, and the powder cb-3 was milled, whereby slurry cb-3 with an average particle diameter of 3 μm was formed. The slurry c-3 was coated by 141 g/L on a honeycomb carrier (capacity: 0.04 L) having a diameter of ø36 mm and 400 cells with a wall thickness of 6 mils, followed by drying, and thereafter, the slurry cb-3 was coated by 59 g/L thereon, followed by drying. Thereafter, a resultant was calcined at 400° C., whereby a sample of Comparative example 3 was obtained. The obtained sample of Comparative example 3 is a catalyst that individually carries thereon Pt by 0.593 g/L and Rh by 0.236 g/L.

Comparative Example 4

Cerium-zirconium composite oxide particles with an average particle diameter of 30 nm were used as the first compounds 5. Dinitrodiamine Pt was impregnated into the cerium-zirconium composite oxide particles, whereby cerium-zirconium composite oxide particles having Pt supported thereon by 0.85% (these are referred to as "particles A") were formed. 90.9 g of alumina nanoparticles with an average particle diameter of 130 nm (in which moisture was contained by 1 wt %) was put into a beaker, dispersed into water, and made acidic. To a resultant thus obtained, 90 g of the particles A prepared in advance was added, and was dispersed thereinto by high-speed stirring. Thereafter, slurry thus obtained was dried and calcined, whereby powder c-4 in which the particles A were coated with alumina was prepared. 173.4 g of this powder c-4 and 1.6 g of boehmite alumina were added to a ball mill. Thereafter, 307.5 g of water and 17.5 g of a 10 wt % nitric acid solution were added to the ball mill, and the powder c-4 was milled, whereby slurry c-4 with an average particle diameter of 3 μm was formed.

Next, rhodium nitrate was impregnated into zirconium-lanthanum composite oxide particles with an average particle diameter of 20 nm, whereby particles B having rhodium supported thereon by 0.814% were prepared. 90.9 g of alumina nanoparticles with an average particle diameter of 130 nm (in which moisture was contained by 1%) was put into a beaker, dispersed into water, and made acidic. To a resultant thus obtained, 90 g of the particles B prepared in advance was added, and was dispersed thereinto by high-speed stirring. Thereafter, slurry thus obtained was dried and calcined, whereby powder cb-4 in which the particles B were coated with alumina was prepared. 172 g of this powder cb-4 and 3 g of boehmite alumina were added to a ball mill. Thereafter, 307.5 g of water and 17.5 g of a 10% nitric acid solution were further added to the ball mill, and the powder cb-4 was milled, whereby slurry cb-4 with an average particle diameter of 3 μm was formed. The slurry c-4 was coated by 141 g/L on a honeycomb carrier (capacity: 0.04 L) having a diameter of ø36 mm and 400 cells with a wall thickness of 6 mils, followed by drying, and thereafter, the slurry cb-4 was coated by 59 g/L thereon, followed by drying. Thereafter, a resultant was calcined at 400° C., whereby a sample of Comparative example 4 was obtained. The obtained sample of Comparative example 4 is a catalyst that individually carries thereon Pt by 0.593 g/L and Rh by 0.236 g/L.

Comparative Example 5

Cerium-zirconium composite oxide particles with an average particle diameter of 30 nm were used as the first compounds 5. Dinitrodiamine Pt was impregnated into the particles, whereby cerium-zirconium composite oxide particles having Pt supported thereon by 0.85% (these are referred to as "particles A") were formed. 120 g of needle-like boehmite (150 nm×ø10 nm; aspect ratio: 15) (in which moisture was contained by 25%) was put into a beaker, dispersed into water, and deflocculated by acid. To a resultant thus obtained, 90 g of the particles A prepared in advance was added, and was dispersed thereinto by high-speed stirring. Thereafter, slurry thus obtained was dried and calcined, whereby powder c-5 in which the particles A were coated with alumina was prepared (only this needle-like boehmite was calcined, and a pore volume thereof was investigated, then the pore volume was 0.7 cm³/g). 173.4 g of this powder c-5 and 1.6 g of boehmite alumina were added to a ball mill. Thereafter, 307.5 g of water and 17.5 g of a 10% nitric acid solution were added to the ball mill, and the powder c-5 was milled, whereby slurry c-5 with an average particle diameter of 3 μm was formed.

Next, rhodium nitrate was impregnated into zirconium-lanthanum composite oxide particles with an average particle diameter of 20 nm, whereby particles B having rhodium supported thereon by 0.814% were prepared. 120 g of needle-like boehmite (150 nm×ø10 nm; aspect ratio: 15) (in which moisture was contained by 25%) was put into a beaker, dispersed into water, and deflocculated by acid. To a resultant thus obtained, 90 g of the particles B prepared in advance was added, and was dispersed thereinto by high-speed stirring. Thereafter, slurry thus obtained was dried and calcined, whereby powder cb-5 in which the particles B were coated with alumina was prepared. 172 g of this powder cb-5 and 3 g of boehmite alumina were added to a ball mill. Thereafter, 307.5 g of water and 17.5 g of a 10% nitric acid solution were further added to the ball mill, and the powder cb-5 was milled, whereby slurry cb-5 with an average particle diameter of 3 μm was formed. The slurry c-5 was coated by 141 g/L on a honeycomb carrier (capacity: 0.04 L) having a diameter of ø36 mm and 400 cells with a wall thickness of 6 mils, followed by drying, and thereafter, the slurry cb-5 was coated by 59 g/L thereon, followed by drying. Thereafter, a resultant was calcined at 400° C., whereby a sample of Comparative example 5 was obtained. The obtained sample of Comparative example 5 is a catalyst that individually carries thereon Pt by 0.593 g/L and Rh by 0.236 g/L.

Comparative Example 6

Cerium-zirconium composite oxide particles with an average particle diameter of 30 nm were used as the first compounds 5. Dinitrodiamine Pt was impregnated into the cerium-zirconium particles, whereby cerium-zirconium composite oxide particles having Pt supported thereon by 0.85% (these are referred to as "particles A") were formed. 113.92 g of plate-like boehmite (5×20×20 nm; aspect ratio: 0.25) (in which moisture was contained by 21%) was put into a beaker, dispersed into water, and deflocculated by acid. To a resultant thus obtained, 90 g of the particles A prepared in advance was added, and was dispersed thereinto by high-speed stirring. Thereafter, slurry thus obtained was dried and calcined, whereby powder c-6 in which the particles A were coated with alumina was prepared (only this plate-like boehmite was calcined, and a pore volume thereof was investigated, then the pore volume was 0.85 cm³/g). 173.4 g of this powder c-6 and 1.6 g of boehmite alumina were added to a ball mill. Thereafter, 307.5 g of water and 17.5 g of a 10% nitric acid solution were added to the ball mill, and the powder c-6 was milled, whereby slurry c-6 with an average particle diameter of 3 μm was formed.

Next, rhodium nitrate was impregnated into zirconium-lanthanum composite oxide particles with an average particle diameter of 20 nm, whereby particles B having rhodium supported thereon by 0.814% were prepared. 113.92 g of plate-like boehmite (5×20×20 nm; aspect ratio: 0.25) (in which moisture was contained by 21%) was put into a beaker, dispersed into water, and deflocculated by acid. To a resultant thus obtained, 90 g of the particles B prepared in advance was added, and was dispersed thereinto by high-speed stirring. Thereafter, slurry thus obtained was dried and calcined, whereby powder cb-6 in which the particles B were coated with alumina was prepared. 172 g of this powder cb-6 and 3 g of boehmite alumina were added to a ball mill. Thereafter, 307.5 g of water and 17.5 g of a 10% nitric acid solution were further added to the ball mill, and the powder cb-6 was milled, whereby slurry cb-6 with an average particle diameter of 3 μm was formed. The slurry c-6 was coated by 141 g/L on a honeycomb carrier (capacity: 0.04 L) having a diameter of ø36 mm and 400 cells with a wall thickness of 6 mils, followed by drying, and thereafter, the slurry cb-6 was coated by 59 g/L thereon, followed by drying. Thereafter, a resultant was calcined at 400° C., whereby a sample of Comparative example 6 was obtained. The obtained sample of Comparative example 6 is a catalyst that individually carries thereon Pt by 0.593 g/L and Rh by 0.236 g/L.

Comparative Example 7

Cerium-zirconium composite oxide particles with a pore volume of 0.15 cm³/g were used as the first compounds 5. Dinitrodiamine Pt was impregnated into the particles, whereby cerium-zirconium composite oxide particles having Pt supported thereon by 0.85% (these are referred to as "particles D4") were formed. Aluminum isopropoxide equivalent to 90 g of $Al_2O_3$ was dissolved into 2-methyl-2,4-pentanediol. To a solution thus obtained, 90 g of the particles D4 was added, and water was further added thereto, whereby hydrolysis was performed therefor. The water and organic matter such as the 2-methyl-2,4-pentanediol were evaporated and dried, followed by calcining, whereby powder c-7 in which the particles D4 were coated with alumina was prepared. 173.4 g of this powder c-7 and 1.6 g of boehmite alumina were added to a ball mill. Thereafter, 307.5 g of water and 17.5 g of a 10 wt % nitric acid solution were added to the ball mill, and the powder c-7 was milled, whereby slurry c-7 with an average particle diameter of 3 μm was formed.

Next, rhodium nitrate was impregnated into zirconium-lanthanum composite oxide particles with a pore volume of 0.16 $cm^3/g$, whereby particles E4 having rhodium supported thereon by 0.814% were prepared. Aluminum isopropoxide equivalent to 90 g of $Al_2O_3$ was dissolved into 2-methyl-2,4-pentanediol. To a solution thus obtained, 90 g of the particles E4 was added, and water was further added thereto, whereby hydrolysis was performed therefor. The water and organic matter such as the 2-methyl-2,4-pentanediol were evaporated and dried, followed by calcining, whereby powder cb-7 in which the particles E4 were coated with alumina was prepared. 172 g of this powder cb-7 and 3 g of boehmite alumina were added to a ball mill. Thereafter, 307.5 g of water and 17.5 g of a 10% nitric acid solution were further added to the ball mill, and the powder cb-7 was milled, whereby slurry cb-7 with an average particle diameter of 3 μm was formed. The slurry c-7 was coated by 141 g/L on a honeycomb carrier (capacity: 0.04 L) having a diameter of ø36 mm and 400 cells with a wall thickness of 6 mils, followed by drying, and thereafter, the slurry cb-7 was coated by 59 g/L thereon, followed by drying. Thereafter, a resultant was calcined at 400° C., whereby a sample of Comparative example 7 was obtained. The obtained sample of Comparative example 7 is a catalyst that individually carries thereon Pt by 0.593 g/L and Rh by 0.236 g/L.

Comparative Example 8

Cerium-zirconium composite oxide particles with a pore volume of 0.4 $cm^3/g$ were used as the first compounds 5. Dinitrodiamine Pt was impregnated into the particles, whereby cerium-zirconium composite oxide particles having Pt supported thereon by 0.85% (these are referred to as "particles D5") were formed. Aluminum isopropoxide equivalent to 90 g of $Al_2O_3$ was dissolved into 2-methyl-2,4-pentanediol. To a solution thus obtained, 90 g of the particles D5 was added, and water was further added thereto, whereby hydrolysis was performed therefor. The water and organic matter such as the 2-methyl-2,4-pentanediol were evaporated and dried, followed by calcining, whereby powder c-8 in which the particles D5 were coated with alumina was prepared. 173.4 g of this powder c-8 and 1.6 g of boehmite alumina were added to a ball mill. Thereafter, 307.5 g of water and 17.5 g of a 10% nitric acid solution were added to the ball mill, and the powder c-8 was milled, whereby slurry c-8 with an average particle diameter of 3 μm was formed.

Next, rhodium nitrate was impregnated into zirconium-lanthanum composite oxide particles with a pore volume of 0.41 $cm^3/g$, whereby particles E5 having rhodium supported thereon by 0.814% were prepared. Aluminum isopropoxide equivalent to 90 g of $Al_2O_3$ was dissolved into 2-methyl-2,4-pentanediol. To a solution thus obtained, 90 g of the particles E5 was added, and water was further added thereto, whereby hydrolysis was performed therefor. The water and organic matter such as the 2-methyl-2,4-pentanediol were evaporated and dried, followed by calcining, whereby powder cb-8 in which the particles E5 were coated with alumina was prepared. 172 g of this powder cb-8 and 3 g of boehmite alumina were added to a ball mill. Thereafter, 307.5 g of water and 17.5 g of a 10% nitric acid solution were further added to the ball mill, and the powder cb-8 was milled, whereby slurry cb-8 with an average particle diameter of 3 μm was formed. The slurry c-8 was coated by 141 g/L on a honeycomb carrier (capacity: 0.04 L) having a diameter of ø36 mm and 400 cells with a wall thickness of 6 mils, followed by drying, and thereafter, the slurry cb-8 was coated by 59 g/L thereon, followed by drying. Thereafter, a resultant was calcined at 400° C., whereby a sample of Comparative example 8 was obtained. The obtained sample of Comparative example 8 is a catalyst that individually carries thereon Pt by 0.593 g/L and Rh by 0.236 g/L.

Comparative Example 9

Cerium-zirconium composite oxide particles in which cerium oxide occupied 70% and zirconium oxide occupied 30% in terms of composition were used as the first compounds 5. Dinitrodiamine Pt was impregnated into the particles, whereby cerium-zirconium composite oxide particles having Pt supported thereon by 0.85% (these are referred to as "particles F4") were formed. Aluminum isopropoxide equivalent to 90 g of $Al_2O_3$ was dissolved into 2-methyl-2,4-pentanediol. To a solution thus obtained, 90 g of the particles F4 was added, and water was further added thereto, whereby hydrolysis was performed therefor. The water and organic matter such as the 2-methyl-2,4-pentanediol were evaporated and dried, followed by calcining, whereby powder c-9 in which the particles F4 were coated with alumina was prepared. 173.4 g of this powder c-9 and 1.6 g of boehmite alumina were added to a ball mill. Thereafter, 307.5 g of water and 17.5 g of a 10% nitric acid solution were added to the ball mill, and the powder c-9 was milled, whereby slurry c-9 with an average particle diameter of 3 μm was formed.

Next, rhodium nitrate was impregnated into zirconium-lanthanum composite oxide particles in which zirconium occupied 90% and lanthanum occupied 10%, whereby particles G4 having rhodium supported thereon by 0.814% were prepared. Aluminum isopropoxide equivalent to 90 g of $Al_2O_3$ was dissolved into 2-methyl-2,4-pentanediol. To a solution thus obtained, 90 g of the particles G4 was added, and water was further added thereto, whereby hydrolysis was performed therefor. The water and organic matter such as the 2-methyl-2,4-pentanediol were evaporated and dried, followed by calcining, whereby powder cb-9 in which the particles G4 were coated with alumina was prepared. 172 g of this powder cb-9 and 3 g of boehmite alumina were added to a ball mill. Thereafter, 307.5 g of water and 17.5 g of a 10% nitric acid solution were further added to the ball mill, and the powder cb-9 was milled, whereby slurry cb-9 with an average particle diameter of 3 μm was formed. The slurry c-9 was coated by 141 g/L on a honeycomb carrier (capacity: 0.04 L) having a diameter of ø36 mm and 400 cells with a wall thickness of 6 mils, followed by drying, and thereafter, the slurry cb-9 was coated by 59 g/L thereon, followed by drying. Thereafter, a resultant was calcined at 400° C., whereby a sample of Comparative example 9 was obtained. The obtained sample of Comparative example 9 is a catalyst that individually carries thereon Pt by 0.593 g/L and Rh by 0.236 g/L.

Comparative Example 10

Cerium-zirconium composite oxide particles in which cerium oxide occupied 90% and zirconium oxide occupied 10% in terms of composition were used as the first compounds 5. Dinitrodiamine Pt was impregnated into the particles, whereby cerium-zirconium composite oxide particles having Pt supported thereon by 0.85% (these are referred to as "particles F5") were formed. Aluminum isopropoxide equivalent to 90 g of $Al_2O_3$ was dissolved into 2-methyl-2,4-pentanediol. To a solution thus obtained, 90 g of the particles F5 was added, and water was further added thereto, whereby hydrolysis was performed therefor. The water and organic matter such as the 2-methyl-2,4-pentanediol were evaporated and dried, followed by calcining, whereby powder c-10 in which the particles F5 were coated with alumina was prepared. 173.4 g of this powder c-10 and 1.6 g of boehmite alumina were added to a ball mill. Thereafter, 307.5 g of water and 17.5 g of a 10% nitric acid solution were added to the ball mill, and the powder c-10 was milled, whereby slurry c-10 with an average particle diameter of 3 µm was formed.

Next, rhodium nitrate was impregnated into zirconia particles in which zirconia occupied 100%, whereby particles G5 having rhodium supported thereon by 0.814% were prepared. Aluminum isopropoxide equivalent to 90 g of $Al_2O_3$ was dissolved into 2-methyl-2,4-pentanediol. To a solution thus obtained, 90 g of the particles G5 was added, and water was further added thereto, whereby hydrolysis was performed therefor. The water and organic matter such as the 2-methyl-2,4-pentanediol were evaporated and dried, followed by calcining, whereby powder cb-10 in which the particles G5 were coated with alumina was prepared. 172 g of this powder cb-10 and 3 g of boehmite alumina were added to a ball mill. Thereafter, 307.5 g of water and 17.5 g of a 10% nitric acid solution were further added to the ball mill, and the powder cb-10 was milled, whereby slurry cb-10 with an average particle diameter of 3 µm was formed. The slurry c-10 was coated by 141 g/L on a honeycomb carrier (capacity: 0.04 L) having a diameter of ø36 mm and 400 cells with a wall thickness of 6 mils, followed by drying, and thereafter, the slurry cb-10 was coated by 59 g/L thereon, followed by drying. Thereafter, a resultant was calcined at 400° C., whereby a sample of Comparative example 10 was obtained. The obtained sample of Comparative example 10 is a catalyst that individually carries thereon Pt by 0.593 g/L and Rh by 0.236 g/L.

Comparative Example 11

Cerium-zirconium composite oxide particles with an average particle diameter of 30 nm were used as the first compounds 5. Dinitrodiamine Pt was impregnated into the particles, whereby cerium-zirconium composite oxide particles having Pt supported thereon by 0.85% (these are referred to as "particles A") were formed. Aluminum isopropoxide equivalent to 87.3 g of $Al_2O_3$ was dissolved into 2-methyl-2,4-pentanediol. To a solution thus obtained, cerium acetylacetonate was added so that an amount thereof as cerium oxide could be 1.8 g, and moreover, zirconium acetylacetonate was added so that an amount thereof as zirconium oxide could be 0.9 g. To a resultant thus obtained, 90 g of the particles A was added, and water was further added thereto, whereby hydrolysis was performed therefor. The water and organic matter such as the 2-methyl-2,4-pentanediol were evaporated and dried, followed by calcining, whereby powder c-1 in which the particles A were coated with alumina was prepared. 173.4 g of this powder c-11 and 1.6 g of boehmite alumina were added to a ball mill. Thereafter, 307.5 g of water and 17.5 g of a 10% nitric acid solution were added to the ball mill, and the powder c-11 was milled, whereby slurry c-11 with an average particle diameter of 3 µm was formed.

Next, rhodium nitrate was impregnated into zirconium-lanthanum composite oxide particles with an average particle diameter of 20 nm, whereby particles B having rhodium supported thereon by 0.814% were prepared. Aluminum isopropoxide equivalent to 90 g of $Al_2O_3$ was dissolved into 2-methyl-2,4-pentanediol. To a solution thus obtained, 90 g of the particles B was added, and water was further added thereto, whereby hydrolysis was performed therefor. The water and organic matter such as the 2-methyl-2,4-pentanediol were evaporated and dried, followed by calcining, whereby powder cb-3 in which the particles B were coated with alumina was prepared. 172 g of this powder cb-3 and 3 g of boehmite alumina were added to a ball mill. Thereafter, 307.5 g of water and 17.5 g of a 10% nitric acid solution were further added to the ball mill, and the powder cb-3 was milled, whereby slurry cb-3 with an average particle diameter of 3 µm was formed. The slurry c-11 was coated by 141 g/L on a honeycomb carrier (capacity: 0.04 L) having a diameter of ø36 mm and 400 cells with a wall thickness of 6 mils, followed by drying, and thereafter, the slurry cb-3 was coated by 59 g/L thereon, followed by drying. Thereafter, a resultant was calcined at 400° C., whereby a sample of Comparative example 11 was obtained. The obtained sample of Comparative example 11 is a catalyst that individually carries thereon Pt by 0.593 g/L and Rh by 0.236 g/L.

Comparative Example 12

Cerium-zirconium composite oxide particles with an average particle diameter of 30 nm were used as the first compounds 5. Dinitrodiamine Pt was impregnated into the particles, whereby cerium-zirconium composite oxide particles having Pt supported thereon by 0.85% (these are referred to as "particles A") were formed. Aluminum isopropoxide equivalent to 63 g of $Al_2O_3$ was dissolved into 2-methyl-2,4-pentanediol. To a solution thus obtained, cerium acetylacetonate was added so that an amount thereof as cerium oxide could be 18.0 g, and moreover, zirconium acetylacetonate was added so that an amount thereof as zirconium oxide could be 9.0 g. To a resultant thus obtained, 90 g of the particles A was added, and water was further added thereto, whereby hydrolysis was performed therefor. The water and organic matter such as the 2-methyl-2,4-pentanediol were evaporated and dried, followed by calcining, whereby powder c-12 in which the particles A were coated with alumina was prepared. 173.4 g of this powder c-12 and 1.6 g of boehmite alumina were added to a ball mill. Thereafter, 307.5 g of water and 17.5 g of a 10% nitric acid solution were added to the ball mill, and the powder c-12 was milled, whereby slurry c-12 with an average particle diameter of 3 µm was formed.

Next, rhodium nitrate was impregnated into zirconium-lanthanum composite oxide particles with an average particle diameter of 20 nm, whereby particles B having rhodium supported thereon by 0.814% were prepared. Aluminum isopropoxide equivalent to 90 g of $Al_2O_3$ was dissolved into 2-methyl-2,4-pentanediol. To a solution thus obtained, 90 g of the particles B was added, and water was further added thereto, whereby hydrolysis was performed therefor. The water and organic matter such as the 2-methyl-2,4-pentanediol were evaporated and dried, followed by calcining, whereby powder cb-3 in which the particles B were coated with alumina was prepared. 172 g of this powder cb-3 and 3 g of boehmite alumina were added to a ball mill. Thereafter, 307.5 g of water and 17.5 g of a 10% nitric acid solution were further added to the ball mill, and the powder cb-3 was milled, whereby slurry cb-3 with an average particle diameter of 3 μm was formed. The slurry c-12 was coated by 141 g/L on a honeycomb carrier (capacity: 0.04 L) having a diameter of ø36 mm and 400 cells with a wall thickness of 6 mils, followed by drying, and thereafter, the slurry cb-3 was coated by 59 g/L thereon, followed by drying. Thereafter, a resultant was calcined at 400° C., whereby a sample of Comparative example 12 was obtained. The obtained sample of Comparative example 12 is a catalyst that individually carries thereon Pt by 0.593 g/L and Rh by 0.236 g/L.

Comparative Example 13

Cerium-zirconium composite oxide particles with an average particle diameter of 30 nm were used as the first compounds 5. Dinitrodiamine Pt was impregnated into the particles, and a resultant was calcined at 800° C. for two hours, whereby cerium-zirconium composite oxide particles having Pt supported thereon by 0.85% (these are referred to as "particles 14") were formed. A degree of dispersion of Pt in the particles I4 was 40%. Aluminum isopropoxide equivalent to 90 g of $Al_2O_3$ was dissolved into 2-methyl-2,4-pentanediol. To a solution thus obtained, 90 g of the particles I4 was added, and water was further added thereto, whereby hydrolysis was performed therefor. The water and organic matter such as the 2-methyl-2,4-pentanediol were evaporated and dried, followed by calcining, whereby powder c-13 in which the particles I4 were coated with alumina was prepared. 173.4 g of this powder c-13 and 1.6 g of boehmite alumina were added to a ball mill. Thereafter, 307.5 g of water and 17.5 g of a 10% nitric acid solution were added to the ball mill, and the powder c-13 was milled, whereby slurry c-13 with an average particle diameter of 3 μm was formed.

Next, rhodium nitrate was impregnated into zirconium-lanthanum composite oxide particles with an average particle diameter of 20 nm, and a resultant was calcined at 700° C. for two hours, whereby particles J4 having rhodium supported thereon by 0.814% were prepared. A degree of dispersion of Rh in the particles J4 was 45%. Aluminum isopropoxide equivalent to 90 g of $Al_2O_3$ was dissolved into 2-methyl-2,4-pentanediol. To a solution thus obtained, 90 g of the particles J4 was added, and water was further added thereto, whereby hydrolysis was performed therefor. The water and organic matter such as the 2-methyl-2,4-pentanediol were evaporated and dried, followed by calcining, whereby powder cb-13 in which the particles J4 were coated with alumina was prepared. A degree of dispersion of Rh in the powder cb-13 was 30%. 172 g of this powder cb-13 and 3 g of boehmite alumina were added to a ball mill. Thereafter, 307.5 g of water and 17.5 g of a 10% nitric acid solution were further added to the ball mill, and the powder cb-13 was milled, whereby slurry cb-13 with an average particle diameter of 3 μm was formed. The slurry c-13 was coated by 141 g/L on a honeycomb carrier (capacity: 0.04 L) having a diameter of ø36 mm and 400 cells with a wall thickness of 6 mils, followed by drying, and thereafter, the slurry cb-13 was coated by 59 g/L thereon, followed by drying. Thereafter, a resultant was calcined at 400° C., whereby a sample of Comparative example 13 was obtained. The obtained sample of Comparative example 13 is a catalyst that individually carries thereon Pt by 0.593 g/L and Rh by 0.236 g/L.

[Evaluation]

The catalysts prepared according to Examples 1 to 28 and Comparative examples 1, 2 and 3 to 13 were used, and five pieces of each were mounted per bank in exhaust portions of a V-engine with a displacement of 3500 cc. A durability test was performed in such a manner that Japanese-domestic regular gasoline was used, a catalyst inlet temperature was set at 650° C., and the engine was operated for 30 hours. Then, a thermal history was inspected. Moreover, each of the catalysts after the durability test was built in a simulation exhaust gas flowing device, simulation exhaust gas with a composition shown in Table 1 was flown through the simulation exhaust gas flowing device, and temperatures at which purification rates for NOx, CO and $HC(C_3H_6)$ became 50% (T50 temperature) were investigated while raising a catalyst temperature at a rate of 30° C./min. Furthermore, a first layer and second layer of each of the catalysts after the durability test were scraped off, and pore volumes of such catalyst layers, which were measured by a gas adsorption method, were inspected.

TABLE 1

| REACTION GAS COMPOSITION | |
|---|---|
| NO | 1000 ppm |
| $O_2$ | 0.60% |
| $H_2$ | 0.20% |
| $HC(C_3H_6)$ | 1665 ppmC |
| CO | 0.60% |
| $CO_2$ | 15.50% |
| $H_2O$ | 10% |
| $N_2$ | RESIDUE |

SPACE VELOCITY: SV = 60000/h

Figure 4:
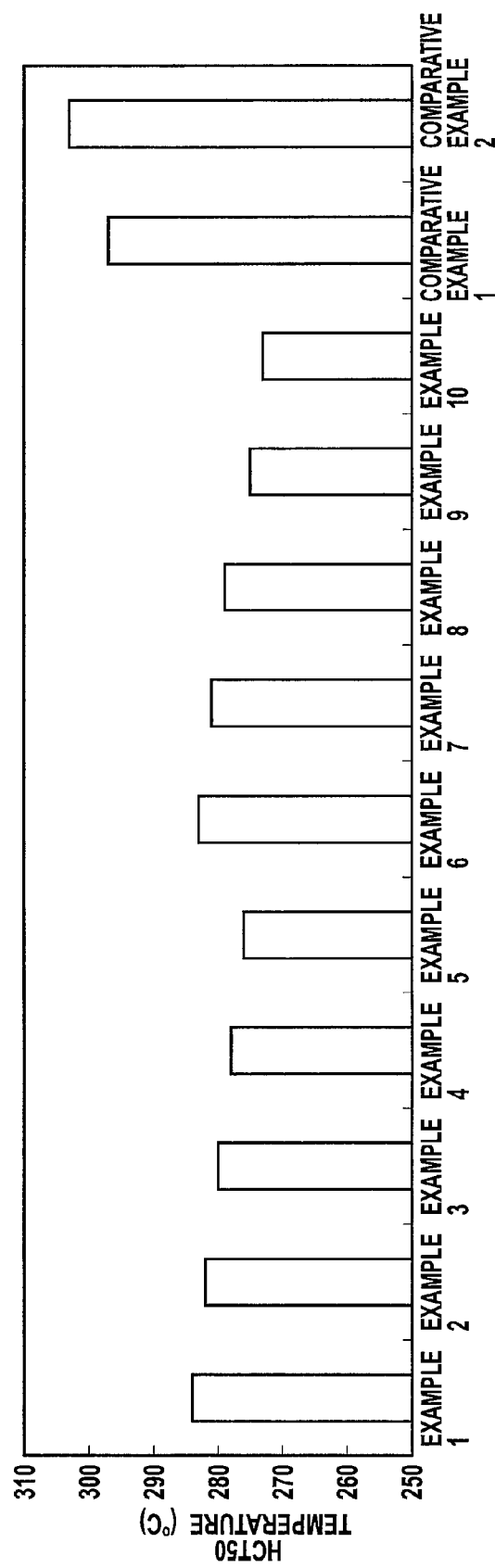
FIG. 4 is a graph for comparing temperatures at which $HC(C_3H_6)$ purification rates of respective catalysts in Examples 1 to 10 and Comparative examples 1 and 2 become 50%.

Table 2 shows evaluation results and the pore volumes of the catalyst layers in the respective catalysts of Example 1 to Example 10 and Comparative example 1 and Comparative example 2. Moreover, FIG. 4 shows HC T50 temperatures, at which $HC(C_3H_6)$ purification rates became 50%, for Example 1 to Example 10 and Comparative example 1 and Comparative example 2.

TABLE 2

| | FIRST LAYER | | | | SECOND LAYER | |
|---|---|---|---|---|---|---|
| | PRECIOUS METAL | FIRST COMPOUND | SECOND COMPOUND | PORE VOLUME ($cm^3$/g) | PRECIOUS METAL | FIRST COMPOUND |
| EXAMPLE 1 | Pt | $CeO_2$ | $Al_2O_3$ | 0.25 | Rh | ZrCe COMPOSITE OXIDE |
| EXAMPLE 2 | Pt | $CeO_2$ | $Al_2O_3$ | 0.31 | Rh | ZrCe COMPOSITE OXIDE |

TABLE 2-continued

| | | | | | | |
|---|---|---|---|---|---|---|
| EXAMPLE 3 | Pt | CeO$_2$ | Al$_2$O$_3$ | 0.33 | Rh | ZrCe COMPOSITE OXIDE |
| EXAMPLE 4 | Pt | CeO$_2$ | Al$_2$O$_3$ | 0.35 | Rh | ZrCe COMPOSITE OXIDE |
| EXAMPLE 5 | Pt | CeO$_2$ | Al$_2$O$_3$ | 0.60 | Rh | ZrCe COMPOSITE OXIDE |
| EXAMPLE 6 | Pt | CeZr COMPOSITE OXIDE | Al$_2$O$_3$ | 0.24 | Rh | ZrCe COMPOSITE OXIDE |
| EXAMPLE 7 | Pt | CeZr COMPOSITE OXIDE | Al$_2$O$_3$ | 0.30 | Rh | ZrCe COMPOSITE OXIDE |
| EXAMPLE 8 | Pt | CeZr COMPOSITE OXIDE | Al$_2$O$_3$ | 0.32 | Rh | ZrCe COMPOSITE OXIDE |
| EXAMPLE 9 | Pd | MANGANESE ALUMINATE | Al$_2$O$_3$ | 0.32 | Rh | ZrCe COMPOSITE OXIDE |
| EXAMPLE 10 | Pd | MANGANESE ALUMINATE | Al$_2$O$_3$ | 0.35 | Rh | ZrCe COMPOSITE OXIDE |
| COMPARATIVE EXAMPLE 1 | Pt | CeO$_2$ | Al$_2$O$_3$ | 0.22 | Rh | ZrCe COMPOSITE OXIDE |
| COMPARATIVE EXAMPLE 2 | Pt | CeO$_2$ | Al$_2$O$_3$ | 0.65 | Rh | ZrCe COMPOSITE OXIDE |

| | SECOND LAYER | | NOx 50% | HC 50% | CO 50% |
|---|---|---|---|---|---|
| | SECOND COMPOUND | PORE VOLUME (cm$^3$/g) | PURIFICATION TEMPERATURE (° C.) | PURIFICATION TEMPERATURE (° C.) | PURIFICATION TEMPERATURE (° C.) |
| EXAMPLE 1 | Al$_2$O$_3$ | 0.24 | 286 | 284 | 268 |
| EXAMPLE 2 | Al$_2$O$_3$ | 0.30 | 284 | 282 | 266 |
| EXAMPLE 3 | Al$_2$O$_3$ | 0.32 | 282 | 280 | 264 |
| EXAMPLE 4 | Al$_2$O$_3$ | 0.34 | 280 | 278 | 262 |
| EXAMPLE 5 | Al$_2$O$_3$ | 0.57 | 278 | 276 | 260 |
| EXAMPLE 6 | Al$_2$O$_3$ | 0.24 | 285 | 283 | 266 |
| EXAMPLE 7 | Al$_2$O$_3$ | 0.30 | 283 | 281 | 264 |
| EXAMPLE 8 | Al$_2$O$_3$ | 0.32 | 281 | 279 | 262 |
| EXAMPLE 9 | Al$_2$O$_3$ | 0.30 | 277 | 275 | 260 |
| EXAMPLE 10 | Al$_2$O$_3$ | 0.32 | 275 | 273 | 258 |
| COMPARATIVE EXAMPLE 1 | ZrO$_2$ | 0.19 | 299 | 297 | 293 |
| COMPARATIVE EXAMPLE 2 | Al$_2$O$_3$ | 0.63 | 305 | 303 | 300 |

Comparative example 1 is the catalyst, in which alumina from aluminum isopropoxide is used for the first layer, and zirconia was used for the second layer. In both of the layers, the pore volumes were the smallest among the examples. When the Pt particles after the durability test were observed by a TEM, a particle diameter of the Pt particles was approximately 10 nm, coagulation of the Pt particles was small, and coagulation of the Rh particles was also small. However, catalyst activity was low. This is considered to be because, though the particle diameter of the Pt particles is small, the pore volumes are small, the exhaust gas is difficult to pass through the pores, and the exhaust gas is less likely to reach the Pt particles.

In Comparative example 2, alumina particles with a particle diameter as large as 110 nm are used for the first layer. Therefore, the pore volume also becomes large. When the Pt particles were observed by the TEM for the catalyst after the durability test, a particle diameter of the Pt particles became as large as approximately 20 nm or more, the coagulation of the Pt particles was confirmed, and the coagulation of the CeO$_2$ particles was also observed. This is considered to be because, since the alumina particles are large, gaps among the alumina particles are large, the Pt-attached ceria particles moved from the gaps during the durability test, and the coagulation among the ceria particles occurred. It is also considered that the Pt particles were coagulated following the coagulation of the ceria particles, leading to an increase of the diameter of the Pt particles concerned. In a similar way, an increase of the particle diameter of the Rh particles in the second layer was observed to 15 nm. It is considered that the catalyst activity therefore became low though the pore volumes were large.

As opposed to this, in each of the catalysts in Example 1 to Example 8, the particle diameter of the Pt particles after the durability test was approximately 10 nm, and the coagulation of the Pt particles was small. Moreover, the particle diameter of the Rh particles was approximately 6 nm, and the coagulation thereof was small. Furthermore, in each of Example 9 and Example 10, the diameter of the Pd particles was as small as 7 nm to 8 nm, and the coagulation of the Pd particles was small. Also with regard to the Rh particles, the diameter thereof was approximately 6 nm, and the coagulation thereof was small. The catalyst activity of each of these Examples 1 to 10 was extremely good in comparison with those of Comparative examples 1 and 2, and high activity was able to be obtained.

Figure 5:
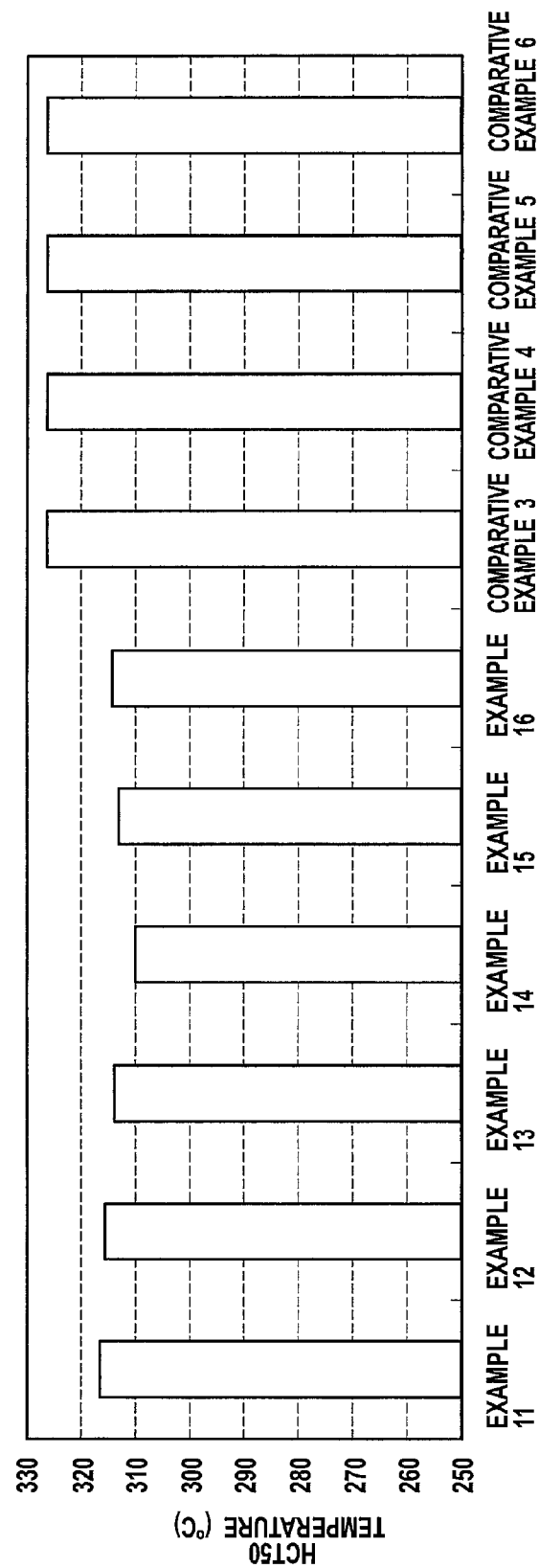
FIG. 5 is a graph for comparing temperatures at which $HC(C_3H_6)$ purification rates of respective catalysts in Examples 11 to 16 and Comparative examples 3 to 6 become 50%.

Table 3 shows evaluation results and the pore volumes of the catalyst layers in the respective catalysts of Example 11 to Example 16 and Comparative example 3 to Comparative example 6. Moreover, FIG. 5 shows HC T50 temperatures, at which the HC(C$_3$H$_6$) purification rates became 50%, for Example 11 to Example 16 and Comparative example 3 to Comparative example 6.

TABLE 3

| | | FIRST LAYER | | | SECOND LAYER | |
|---|---|---|---|---|---|---|
| | PRECIOUS METAL | FIRST COMPOUND | SECOND COMPOUND | PORE VOLUME ($cm^3/g$) | PRECIOUS METAL | FIRST COMPOUND |
| EXAMPLE 11 | Pt | CeZr COMPOSITE OXIDE | $Al_2O_3$ | 0.24 | Rh | ZrLa COMPOSITE OXIDE |
| EXAMPLE 12 | Pt | CeZr COMPOSITE OXIDE | $Al_2O_3$ | 0.34 | Rh | ZrLa COMPOSITE OXIDE |
| EXAMPLE 13 | Pt | CeZr COMPOSITE OXIDE | $Al_2O_3$ | 0.49 | Rh | ZrLa COMPOSITE OXIDE |
| EXAMPLE 14 | Pt | CeZr COMPOSITE OXIDE | $Al_2O_3$ | 0.80 | Rh | ZrLa COMPOSITE OXIDE |
| EXAMPLE 15 | Pd | CeZr COMPOSITE OXIDE | $Al_2O_3$ | 0.33 | Rh | ZrLa COMPOSITE OXIDE |
| EXAMPLE 16 | Pd | CeZr COMPOSITE OXIDE | $Al_2O_3$ | 0.47 | Rh | ZrLa COMPOSITE OXIDE |
| COMPARATIVE EXAMPLE 3 | Pt | CeZr COMPOSITE OXIDE | $Al_2O_3$ | 0.21 | Rh | ZrLa COMPOSITE OXIDE |
| COMPARATIVE EXAMPLE 4 | Pt | CeZr COMPOSITE OXIDE | $Al_2O_3$ | 0.83 | Rh | ZrLa COMPOSITE OXIDE |
| COMPARATIVE EXAMPLE 5 | Pt | CeZr COMPOSITE OXIDE | $Al_2O_3$ | 0.82 | Rh | ZrLa COMPOSITE OXIDE |
| COMPARATIVE EXAMPLE 6 | Pt | CeZr COMPOSITE OXIDE | $Al_2O_3$ | 0.22 | Rh | ZrLa COMPOSITE OXIDE |

| | SECOND LAYER | | NOx 50% | HC 50% | CO 50% |
|---|---|---|---|---|---|
| | SECOND COMPOUND | PORE VOLUME ($cm^3/g$) | PURIFICATION TEMPERATURE (° C.) | PURIFICATION TEMPERATURE (° C.) | PURIFICATION TEMPERATURE (° C.) |
| EXAMPLE 11 | $Al_2O_3$ | 0.25 | 323 | 317 | 315 |
| EXAMPLE 12 | $Al_2O_3$ | 0.33 | 321 | 316 | 314 |
| EXAMPLE 13 | $Al_2O_3$ | 0.51 | 320 | 314 | 312 |
| EXAMPLE 14 | $Al_2O_3$ | 0.78 | 317 | 310 | 308 |
| EXAMPLE 15 | $Al_2O_3$ | 0.32 | 319 | 313 | 310 |
| EXAMPLE 16 | $Al_2O_3$ | 0.49 | 318 | 314 | 311 |
| COMPARATIVE EXAMPLE 3 | $Al_2O_3$ | 0.22 | 329 | 325 | 321 |
| COMPARATIVE EXAMPLE 4 | $Al_2O_3$ | 0.82 | 328 | 326 | 322 |
| COMPARATIVE EXAMPLE 5 | $Al_2O_3$ | 0.81 | 328 | 325 | 321 |
| COMPARATIVE EXAMPLE 6 | $Al_2O_3$ | 0.22 | 329 | 326 | 322 |

Comparative example 3 is the catalyst, in which alumina from aluminum isopropoxide is used for the first layer, and zirconia was used for the second layer. In both of the layers, the pore volumes were the smallest among the examples. When the Pt particles after the durability were observed by the TEM, a particle diameter of the Pt particles was approximately 10 nm, and the coagulation of the Pt particles was small. Moreover, the coagulation of Rh was also small. However, catalyst activity was low. This is considered to be because, though the diameter of the Pt particles is small, the pore volumes are small, the exhaust gas is difficult to pass through the pores, and the exhaust gas is less likely to reach the Pt particles.

In Comparative example 4, alumina particles with a particle diameter as large as 130 nm are used for the first layer. Therefore, the pore volume also takes a large value. When the Pt particles were observed by the TEM for the catalyst after the durability, a diameter of the Pt particles became as large as approximately 20 nm or more, the coagulation of the Pt particles was confirmed, and the coagulation of the cerium-zirconium composite oxide particles was also observed. This is considered to be because, since the alumina particles are large, gaps among the alumina particles are large, the Pt-attached cerium-zirconium composite oxide particles moved from the gaps during the durability, and the coagulation among the cerium-zirconium composite oxide particles occurred. It is also considered that Pt was coagulated following the coagulation of the cerium-zirconium composite oxide particles, leading to an increase of the diameter of the Pt particles concerned. In a similar way, an increase of the particle diameter of the Rh particles in the second layer was observed to 15 nm. It is considered that the catalyst activity therefore became low though the pore volumes were large.

Comparative example 5 is one using, for the source of the alumina, the boehmite in which the aspect ratio is as large as 15, in which the pore volumes are large. When the Pt particles after the durability were observed by the TEM, a diameter of the Pt particles became as large as 20 nm or more, the coagulation of the Pt particles was confirmed, and the coagulation of the cerium-zirconium composite oxide particles was also observed. This is considered to be because, since the alumina particles are long, gaps among the alumina particles become large, the Pt-attached cerium-zirconium composite oxide particles moved from the gaps during the durability, and the coagulation among the cerium-zirconium composite oxide particles occurred. It is also considered that Pt was coagulated following the coagulation of the cerium-zirconium composite oxide particles, leading to an increase of the diameter of the Pt particles concerned. In a similar way, an increase of the particle diameter of the Rh particles in the second layer was observed to 15 nm. It is considered that the catalyst activity therefore became low though the pore volumes were large.

Comparative example 6 is one using, for the source of the alumina, the boehmite in which the aspect ratio is as small as 0.25, in which the pore volumes are small in both of the first layer and the second layer. When the Pt particles after the durability were observed by the TEM, a diameter of the Pt particles was approximately 10 nm, and the coagulation of the Pt particles was small. Moreover, the coagulation of Rh was also small. However, catalyst activity was low. This is considered to be because, though the diameter of the Pt particles is small, the pore volumes are small, the exhaust gas is difficult to pass through the pores, and the exhaust gas is less likely to reach Pt.

As opposed to this, in each of the catalysts in Example 11 to Example 14, the diameter of the Pt particles after the durability was approximately 10 nm, and the coagulation of the Pt particles was small. Moreover, the particle diameter of the Rh particles was approximately 6 nm, and the coagulation thereof was small. Furthermore, in each of Example 15 and Example 16, the diameter of the Pd particles was approximately 6 nm, and the coagulation of the Pd particles was small. Also with regard to the Rh particles, the diameter thereof was approximately 6 nm, and the coagulation thereof was also small. From the above, the catalyst activity of each of these Examples 11 to 16 was extremely good in comparison with those of Comparative examples 3 to 6, and high activity was able to be obtained.

Figure 6:
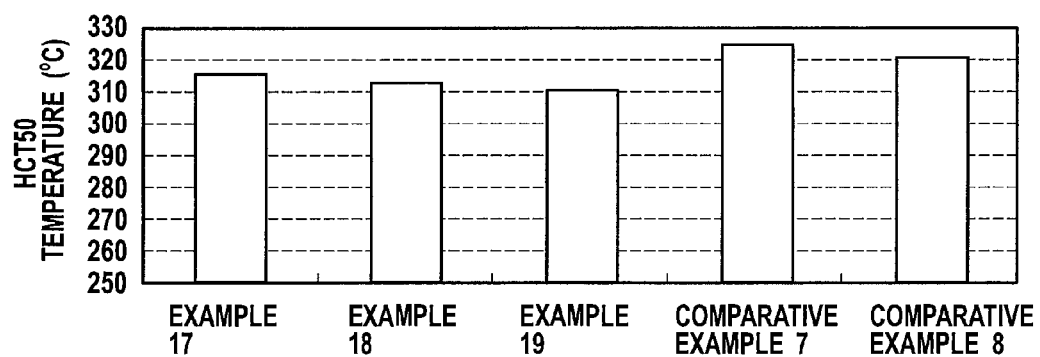
FIG. 6 is a graph for comparing temperatures at which $HC(C_3H_6)$ purification rates of respective catalysts in Examples 17 to 19 and Comparative examples 7 and 8 become 50%.

Table 4 shows evaluation results and the pore volumes of the catalyst layers in the respective catalysts of Example 17 to Example 19 and Comparative examples 7 and 8. Moreover, FIG. 6 shows HC T50 temperatures, at which the HC($C_3H_6$) purification rates became 50%, for Example 17 to Example 19 and Comparative examples 7 and 8.

Comparative example 7 is one using one, in which the pore volume of the cerium-zirconium composite oxide is 0.15 $cm^3/g$, and the volume of the zirconium-lanthanum composite oxide is 0.16 $cm^3/g$, and catalyst activity thereof was low. Catalyst activity was similarly low also in Comparative example 8. This is considered to be because, since the pore volumes of the cerium-zirconium composite oxide and the zirconium-lanthanum composite oxide are small, the pore volumes of the catalyst layers also became small. As opposed to this, in each of the catalysts in Example 17 to Example 19, the diameter of the Pt particles after the durability was approximately 10 nm, and the coagulation of the Pt particles was small. Moreover, the particle diameter of the Rh particles was approximately 6 nm, and the coagulation thereof was also small. From the above, the catalyst activity of each of these Examples 17 to 19 was extremely good in comparison with those of Comparative examples 7 and 8, and high activity is able to be obtained.

Figure 7:
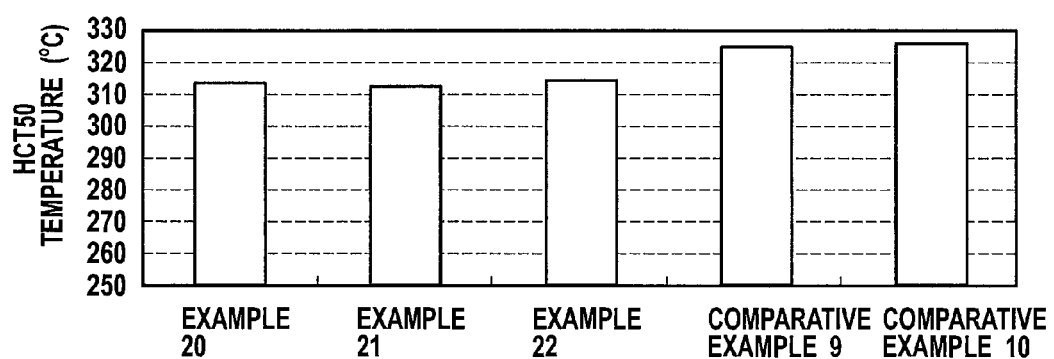
FIG. 7 is a graph for comparing temperatures at which $HC(C_3H_6)$ purification rates of respective catalysts in Examples 20 to 22 and Comparative examples 9 and 10 become 50%.

Table 5 shows evaluation results and the pore volumes of the catalyst layers in the respective catalysts of Example 20 to Example 22 and Comparative examples 9 and 10. Moreover, FIG. 7 shows HC T50 temperatures, at which the HC($C_3H_6$) purification rates became 50%, for Example 20 to Example 22 and Comparative examples 9 and 10.

TABLE 4

| | FIRST LAYER | | | | SECOND LAYER | | | | NOx 50% PURIFICATION TEMPERATURE (° C.) | HC 50% PURIFICATION TEMPERATURE (° C.) | CO 50% PURIFICATION TEMPERATURE (° C.) |
|---|---|---|---|---|---|---|---|---|---|---|---|
| | PRECIOUS METAL | FIRST COMPOUND | SECOND COMPOUND | PORE VOLUME ($cm^3/g$) | PRECIOUS METAL | FIRST COMPOUND PORE VOLUME ($cm^3/g$) | SECOND COMPOUND | PORE VOLUME ($cm^3/g$) | | | |
| EXAMPLE 17 | Pt | CeZr COMPOSITE OXIDE 0.18 | $Al_2O_3$ | 0.43 | Rh | ZrLa COMPOSITE OXIDE 0.28 | $Al_2O_3$ | 0.45 | 321 | 316 | 314 |
| EXAMPLE 18 | Pt | CeZr COMPOSITE OXIDE 0.28 | $Al_2O_3$ | 0.47 | Rh | ZrLa COMPOSITE OXIDE 0.30 | $Al_2O_3$ | 0.47 | 320 | 314 | 311 |
| EXAMPLE 19 | Pt | CeZr COMPOSITE OXIDE 0.30 | $Al_2O_3$ | 0.49 | Rh | ZrLa COMPOSITE OXIDE 0.32 | $Al_2O_3$ | 0.51 | 318 | 312 | 309 |
| COMPARATIVE EXAMPLE 7 | Pt | CeZr COMPOSITE OXIDE 0.15 | $Al_2O_3$ | 0.20 | Rh | ZrLa COMPOSITE OXIDE 0.16 | $Al_2O_3$ | 0.21 | 328 | 326 | 323 |
| COMPARATIVE EXAMPLE 8 | Pt | CeZr COMPOSITE OXIDE 0.40 | $Al_2O_3$ | 0.23 | Rh | ZrLa COMPOSITE OXIDE 0.41 | $Al_2O_3$ | 0.22 | 327 | 323 | 321 |

TABLE 5

| | FIRST LAYER | | | | SECOND LAYER | | | | NOx 50% PURIFICATION TEMPERATURE (° C.) | HC 50% PURIFICATION TEMPERATURE (° C.) | CO 50% PURIFICATION TEMPERATURE (° C.) |
|---|---|---|---|---|---|---|---|---|---|---|---|
| | PRECIOUS METAL | FIRST COMPOUND/ $CeO_2:ZrO_2$ (%) | SECOND COMPOUND | PORE VOLUME ($cm^3/g$) | PRECIOUS METAL | FIRST COMPOUND/ $ZrO_2:La_2O_3$ (%) | SECOND COMPOUND | PORE VOLUME ($cm^3/g$) | | | |
| EXAMPLE 20 | Pt | CeZr COMPOSITE OXIDE 74:26 | $Al_2O_3$ | 0.49 | Rh | ZrLa COMPOSITE OXIDE 95:5 | $Al_2O_3$ | 0.51 | 321 | 314 | 309 |
| EXAMPLE 21 | Pt | CeZr COMPOSITE OXIDE 78:22 | $Al_2O_3$ | 0.50 | Rh | ZrLa COMPOSITE OXIDE 97:3 | $Al_2O_3$ | 0.52 | 319 | 313 | 307 |
| EXAMPLE 22 | Pt | CeZr COMPOSITE OXIDE 80:10 | $Al_2O_3$ | 0.49 | Rh | ZrLa COMPOSITE OXIDE 99:1 | $Al_2O_3$ | 0.51 | 321 | 315 | 309 |
| COMPARATIVE EXAMPLE 9 | Pt | CeZr COMPOSITE OXIDE 70:30 | $Al_2O_3$ | 0.23 | Rh | ZrLa COMPOSITE OXIDE 90:10 | $Al_2O_3$ | 0.22 | 329 | 326 | 322 |
| COMPARATIVE EXAMPLE 10 | Pt | CeZr COMPOSITE OXIDE 90:10 | $Al_2O_3$ | 0.22 | Rh | ZrLa COMPOSITE OXIDE 100:0 | $Al_2O_3$ | 0.22 | 329 | 327 | 323 |

In Comparative example 9 and Comparative example 10, as the first compounds 5, those were used, in which composite ratios of the cerium oxide, the zirconium oxide and the like were changed. In Comparative example 9, the composite ratios of the cerium oxide and the zirconium oxide in the first layer are 70% and 30%, the composite ratios of the zirconium oxide and the lanthanum oxide in the second layer are 90% and 10%, and catalyst activity thereof is low in comparison with those of Examples 20 to 22. In accordance with the observation using the TEM, the diameter of the Pt particles in the first layer was approximately 10 nm. The diameter of the Rh particles in the second layer was as small as approximately 6 nm; however, a state was observed, in which the Rh particles were buried in aggregates of the zirconium-lanthanum composite oxide particles. Moreover, in Comparative example 10, the composite ratios of the cerium oxide and the zirconium oxide in the first layer are 90% and 10%, the zirconium oxide occupied 100% in the second layer, and catalyst activity thereof is low in comparison with those of Examples 20 to 22.

In accordance with the observation using the TEM, the diameter of the Pt particles in the first layer was approximately 10 nm. Although the diameter of the Rh particles in the second layer was as small as approximately 6 nm, the state was observed, in which the Rh particles were buried in the aggregates of the zirconium oxide particles. It is considered that this is caused by the fact that the composite oxide of the cerium oxide and the zirconium oxide is inferior in oxygen evolution capability, as well as that the pore volumes of the catalysts of Comparative examples 9 and 10 are small. Moreover, it is considered that this is caused by the fact that, owing to the composite ratios of the zirconium oxide and the lanthanum oxide, the zirconium-lanthanum composite oxide particles become likely to be coagulated, and the Rh particles are buried in the zirconium-lanthanum composite oxide particles and the zirconium oxide particles, and become difficult to contact the exhaust gas.

Figure 8:
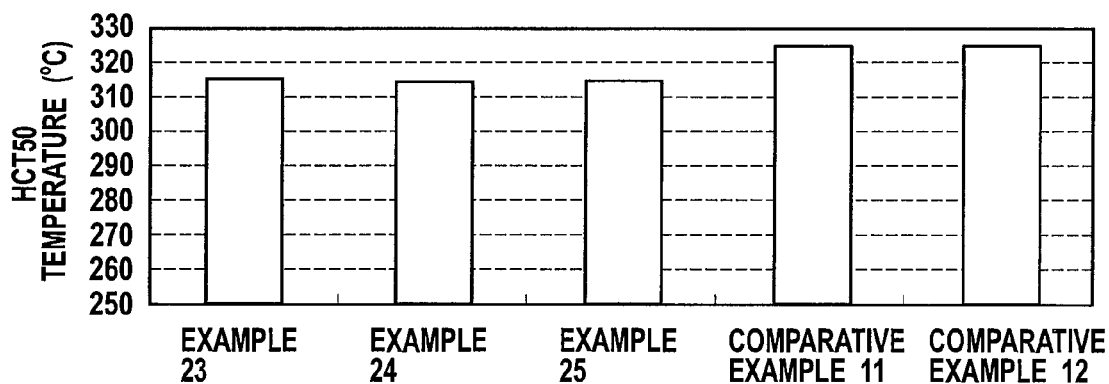
FIG. 8 is a graph for comparing temperatures at which $HC(C_3H_6)$ purification rates of respective catalysts in Examples 23 to 25 and Comparative examples 11 and 12 become 50%.

Table 6 shows evaluation results and the pore volumes of the catalyst layers in the respective catalysts of Example 23 to Example 25 and Comparative examples 11 and 12. Moreover, FIG. 8 shows HC T50 temperatures, at which the $HC(C_3H_6)$ purification rates became 50%, for Example 23 to Example 25 and Comparative examples 11 and 12.

TABLE 6

| | FIRST LAYER | | | | SECOND LAYER | |
|---|---|---|---|---|---|---|
| | PRECIOUS METAL | FIRST COMPOUND | SECOND COMPOUND | PORE VOLUME ($cm^3/g$) | PRECIOUS METAL | FIRST COMPOUND |
| EXAMPLE 23 | Pt | CeZr COMPOSITE OXIDE | $Al_2O_3$ 5:7 | 0.27 | Rh | ZrLa COMPOSITE OXIDE |
| EXAMPLE 24 | Pt | CeZr COMPOSITE OXIDE | $Al_2O_3$ 10:5 | 0.31 | Rh | ZrLa COMPOSITE OXIDE |
| EXAMPLE 25 | Pt | CeZr COMPOSITE OXIDE | $Al_2O_3$ 15:3 | 0.28 | Rh | ZrLa COMPOSITE OXIDE |
| COMPARATIVE EXAMPLE 11 | Pt | CeZr COMPOSITE OXIDE | $Al_2O_3$ 2:1 | 0.22 | Rh | ZrLa COMPOSITE OXIDE |

TABLE 6-continued

| COMPARATIVE EXAMPLE 12 | Pt | CeZr COMPOSITE OXIDE | Al₂O₃ 20:10 | 0.23 | Rh | ZrLa COMPOSITE OXIDE |
|---|---|---|---|---|---|---|

| | SECOND LAYER | | NOx 50% | HC 50% | CO 50% |
|---|---|---|---|---|---|
| | SECOND COMPOUND | PORE VOLUME (cm³/g) | PURIFICATION TEMPERATURE (° C.) | PURIFICATION TEMPERATURE (° C.) | PURIFICATION TEMPERATURE (° C.) |
| EXAMPLE 23 | Al₂O₃ | 0.26 | 322 | 316 | 316 |
| EXAMPLE 24 | Al₂O₃ | 0.26 | 320 | 315 | 313 |
| EXAMPLE 25 | Al₂O₃ | 0.26 | 321 | 316 | 315 |
| COMPARATIVE EXAMPLE 11 | Al₂O₃ | 0.22 | 328 | 326 | 322 |
| COMPARATIVE EXAMPLE 12 | Al₂O₃ | 0.22 | 328 | 326 | 322 |

In Comparative examples 11 and 12, catalyst activities thereof are low in comparison with those of Examples 23 to 25. In Examples 23 to 25, the cerium compound and the zirconium compound are added to such an alumina precursor, whereby heat resistance of the alumina after being calcined is enhanced, and the pore volumes after the durability are maintained largely. However, in Comparative examples 11 and 12, there is no effect of adding the cerium compound and the zirconium compound, the pore volumes after the durability cannot be ensured, and the pore volumes become small, and therefore, it is considered that the exhaust gas becomes less likely to reach the precious metals, leading to such a decrease of the catalyst activity.

Figure 9:
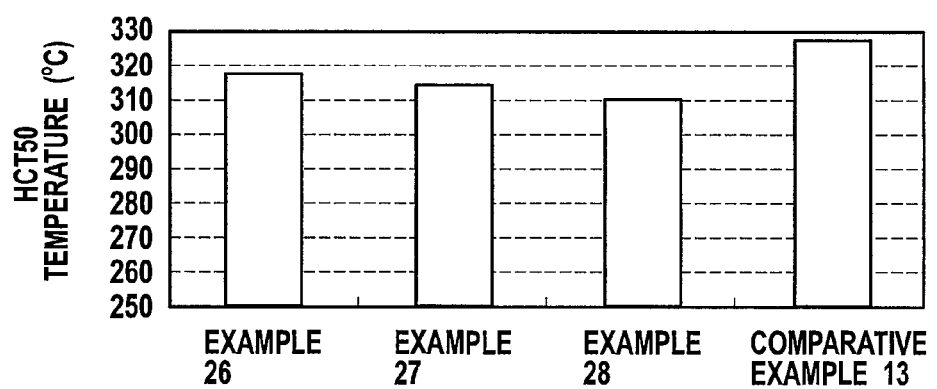
FIG. 9 is a graph for comparing temperatures at which $HC(C_3H_6)$ purification rates of respective catalysts in Examples 26 to 28 and Comparative example 13 become 50%.

Table 7 shows evaluation results and the pore volumes of the catalyst layers in the respective catalysts of Example 26 to Example 28 and Comparative example 13. Moreover, FIG. 9 shows HC T50 temperatures, at which the HC($C_3H_6$) purification rates became 50%, for Example 26 to Example 28 and Comparative examples 13.

In Comparative example 13, catalyst activity thereof is low in comparison with those of Examples 26 to 28. In Examples 26 to 28, the diameter of the Pt particles in the first layer was approximately 10 nm or less in accordance with the observation using the TEM. The diameter of the Rh particles in the second layer was as small as approximately 6 nm or less. This is considered to be because the initial degrees of dispersion of the precious metal particles were high and effects of the precious metals lasted even after the durability. As opposed to this, in Comparative example 13, the diameter of the Pt particles in the first layer was approximately 15 nm in accordance with the observation using the TEM. The diameter of the Rh particles in the second layer was approximately 10 nm, and the particle diameters became somewhat larger in comparison with those of Examples 26 to 28. This is considered to be because the initial degrees of dispersion of the precious

TABLE 7

| | FIRST LAYER | | | | SECOND LAYER | | | | NOx 50% PURIFICATION TEMPERATURE (° C.) | HC 50% PURIFICATION TEMPERATURE (° C.) | CO 50% PURIFICATION TEMPERATURE (° C.) |
|---|---|---|---|---|---|---|---|---|---|---|---|
| | PRECIOUS METAL | FIRST COMPOUND | SECOND COMPOUND | PORE VOLUME (cm³/g) | PRECIOUS METAL | FIRST COMPOUND | SECOND COMPOUND | PORE VOLUME (cm³/g) | | | |
| EXAMPLE 26 | Pt | CeZr COMPOSITE OXIDE | Al₂O₃ | 0.49 | Rh | ZrLa COMPOSITE OXIDE | Al₂O₃ | 0.50 | 324 | 318 | 315 |
| EXAMPLE 27 | Pt | CeZr COMPOSITE OXIDE | Al₂O₃ | 0.49 | Rh | ZrLa COMPOSITE OXIDE | Al₂O₃ | 0.50 | 322 | 315 | 312 |
| EXAMPLE 28 | Pt | CeZr COMPOSITE OXIDE | Al₂O₃ | 0.49 | Rh | ZrLa COMPOSITE OXIDE | Al₂O₃ | 0.50 | 320 | 311 | 309 |
| COMPARATIVE EXAMPLE 13 | Pt | CeZr COMPOSITE OXIDE | Al₂O₃ | 0.22 | Rh | ZrLa COMPOSITE OXIDE | Al₂O₃ | 0.22 | 330 | 328 | 325 | metals were low and the coagulation of the precious metal particles owing to the durability became likely to progress.

INDUSTRIAL APPLICABILITY

The present invention can be applied to the exhaust gas purifying catalyst that purifies the exhaust gas discharged from a vehicle such as an automobile.

The invention claimed is:

1. An exhaust gas purifying catalyst, comprising:
a honeycomb carrier; and
a catalyst layer provided on the honeycomb carrier, the catalyst layer comprising:
  precious metal particles;
  a plurality of first compounds on which the precious metal particles are supported, the first compounds containing a composite oxide of Mn and Al; and
  second compounds which cover the plurality of first compounds on which the precious metal particles are supported and separate the first compounds from one another,
wherein a pore volume of the catalyst layer is within a range of 0.24 to 0.8 cm$^3$/g.

2. The exhaust gas purifying catalyst according to claim 1, wherein the first compounds contain $CeO_2$.

3. The exhaust gas purifying catalyst according to claim 1, wherein the first compounds contain a composite oxide of Ce and Zr.

4. The exhaust gas purifying catalyst according to claim 1, wherein both of the first compounds and the second compounds are formed into a particle shape, and an average particle diameter of the second compounds is 10 to 100 nm.

5. The exhaust gas purifying catalyst according to claim 1, wherein the pore volume of the catalyst layer is within a range of 0.18 to 0.38 cm$^3$/g.

6. The exhaust gas purifying catalyst according to claim 1, wherein a pore volume of a precursor of the second compounds after being calcined is within a range of 0.8 to 1.0 cm$^3$/g.

7. The exhaust gas purifying catalyst according to claim wherein the second compounds comprise $Al_2O_3$ derived from boehmite of which an aspect ratio is within a range of 0.5 to 10.

8. The exhaust gas purifying catalyst according to claim 1, wherein the second compounds comprise alumina.

9. The exhaust gas purifying catalyst according to claim 8, wherein the alumina contains $CeO_2$ that occupies 5 to 15% and $ZrO_2$ that occupies 3 to 7%.

10. The exhaust gas purifying catalyst according to claim 8, wherein a particle diameter of the second compounds is within a range of 10 to 100 nm.

11. An exhaust gas purifying catalyst comprising:
precious metal particles;
a plurality of first compounds on which the precious metal particles are supported, the first compounds containing a composite oxide of Mn and Al; and
second compounds which are arranged among the plurality of first compounds and separate the first compounds from one another,
wherein pore volumes of the precious metal particles, the first compounds and the second compounds are within a range of 0.24 to 0.8 cm$^3$/g.

* * * * *